United States Patent
Shotan

(10) Patent No.: US 10,269,141 B1
(45) Date of Patent: Apr. 23, 2019

(54) MULTISTAGE CAMERA CALIBRATION

(71) Applicant: Waymo LLC, Mountain View, CA (US)

(72) Inventor: Gil Shotan, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 15/996,793

(22) Filed: Jun. 4, 2018

(51) Int. Cl.
*H04N 17/00* (2006.01)
*G06T 7/80* (2017.01)
*H04N 5/232* (2006.01)
*G01S 17/02* (2006.01)
*G06T 5/00* (2006.01)
*G01S 7/497* (2006.01)
*G06T 7/73* (2017.01)

(52) U.S. Cl.
CPC .............. *G06T 7/80* (2017.01); *G01S 7/4972* (2013.01); *G01S 17/023* (2013.01); *G06T 5/006* (2013.01); *G06T 7/73* (2017.01); *H04N 5/23212* (2013.01); *H04N 17/002* (2013.01)

(58) Field of Classification Search
CPC .. H04N 5/23212; H04N 17/002; H04N 17/00; H04N 17/02; G06T 7/80; G06T 7/73; G06T 5/006; G01S 7/4972; G01S 17/023
USPC .......................... 348/175, 180–182, 187, 188
See application file for complete search history.

(56) References Cited

U.S. PATENT DOCUMENTS

| | | |
|---|---|---|
| 6,437,823 B1 | 8/2002 | Zhang |
| 8,619,144 B1 * | 12/2013 | Chang ...................... G06T 7/80 |
| | | 348/180 |
| 2002/0003965 A1 | 1/2002 | Landelle et al. |
| 2008/0031514 A1 | 2/2008 | Kakinami |
| 2008/0181488 A1 | 7/2008 | Ishii et al. |
| 2010/0165116 A1 | 7/2010 | Hsieh et al. |
| 2010/0235129 A1 | 9/2010 | Sharma et al. |
| 2012/0170922 A1 | 7/2012 | Shuster |

(Continued)

OTHER PUBLICATIONS

"Geometric Calibration of Digital Cameras Through Multi-view Rectification"; Luca Lucchese; Image and Vision Computing 23, pp. 517-539; 2005.

(Continued)

*Primary Examiner* — Sherrie Hsia
(74) *Attorney, Agent, or Firm* — McDonnell Boehnen Hulbert & Berghoff LLP

(57) ABSTRACT

Example embodiments relate to multistage camera calibration. An example embodiment includes a method. The method includes positioning a calibration target relative to a camera. The method also includes capturing a focused image of the calibration target. Further, the method includes determining one or more approximate locations of calibration points of the calibration target within the focused image of the calibration target. In addition, the method includes adjusting the focal length of the camera. Still further, the method includes capturing an unfocused image of the calibration target. Additionally, the method includes determining, based on the one or more approximate locations of calibration points of the calibration target within the focused image of the calibration target, one or more refined locations of calibration points of the calibration target within the unfocused image of the calibration target. Yet further, the method includes correcting for one or more optical aberrations within the camera.

20 Claims, 20 Drawing Sheets

(56) References Cited

U.S. PATENT DOCUMENTS

2014/0285676 A1    9/2014   Barreto et al.
2015/0248584 A1    9/2015   Greveson et al.

OTHER PUBLICATIONS

"Calibration of a PMD-camera Using a Planar Calibration Pattern Together with a Multi-camera Setup"; Ingo Schiller, et al.; The International Archives of the Photogrammetry, Remote Sensing and Spatial Information Sciences, vol. XXXVII Part B3a; 2008.

"Novel Method for Structured Light System Calibration"; Song Zhang, et al.; Optical Engineering, vol. 45(8); Aug. 21, 2006.

"OCPAD—Occluded Checkerboard Pattern Detector"; Peter Fuersattel, et al.; 2016 IEEE Winter Conference on Applications of Computer Vision (WACV); Mar. 7-10, 2016.

"Calibration Between Depth and Color Sensors for Commodity Depth Cameras"; Cha Zhang, et al.; Communication and Collaboration Systems Group, Microsoft Research; Advances in Computer Vision and Pattern Recognition; Jul. 15, 2014.

"Extrinsic Calibration Between a Multi-layer Lidar and a Camera"; Sergio Alberto Rodriguez Florez, et al.; IEEE International Conference on Multisensor Fusion and Integration for Intelligent Systems, MFI 2008, pp. 214-219; Aug. 2008.

"ROCHADE: Robust Checkerboard Advanced Detection for Camera Calibration"; Simon Placht, et al.; ECCV 2014, Part IV, LNCS 8692, pp. 766-779; 2014.

"Self-identifying Patterns for Plane-based Camera Calibration"; Mark Fiala, et al.; Machine Vision and Applications 19:209-216; Aug. 3, 2007.

"Pan-Tilt-Zoom Camera Calibration and High-Resolution Mosaic Generation"; Sudipta Sinha, et al.; preprint submitted to Elsevier Science; Jan. 25, 2006.

"On-line Calibration of Multiple LIDARs on a Mobile Vehicle Platform"; Chao Gao, et al.; 2010 IEEE International conference on Robotics and Automation (ICRA); May 3-7, 2010.

'Camera Calibration with OpenCV'; OpenCV 2.4.13.6 documentation » OpenCV Tutorials » calib3d module. Camera calibration and 3D reconstruction; URL: https://docs.opencv.org/2.4/doc/tutorials/calib3d/camera_calibration/camera_calibration.html; retrieved on Apr. 27, 2018.

"Flexible Camera Calibration by Viewing a Plane From Unknown Orientations"; Zhengyou Zhang; The Proceedings of the Seventh IEEE International Conference on Computer Vision, 1999; Sep. 20-27, 1999.

"Camera Calibration and 3D Reconstruction"; OpenCV 24.13.6 documentation » OpenCV API Reference » calib3d. Camera Calibration and 3D Reconstruction; URL: https://docs.opencv.org/2.4/modules/calib3d/doc/camera_calibration_and_3d_reconstruction.html; retrieved on Apr. 27, 2018.

"A Combined Corner and Edge Detector"; Chris Harris, et al.; In Proc. of Fourth Alvey Vision Conference, pp. 147-151; 1988.

"Good Features to Track"; Jianbo Shi, et al.; IEEE Conference on Computer Vision and Pattern Recognition (CVPR94) Seattle; Jun. 1994.

"Feature Detection"; OpenCV 2.4.13.6 documentation » OpenCV API Reference » imgproc. Image Processing; URL: https://docs.opencv.org/2.4/modules/imgproc/doc/feature_detection.html; retrieved on Apr. 27, 2018.

"Subpixel Corners: Increasing accuracy"; Utkarsh Sinha; Al Shack; URL: http://aishack.in/tutorials/subpixel-corners-increasing-accuracy/; retrieved on Apr. 27, 2018.

"Subpixel Measurements Using a Moment-Based Edge Operator"; Edward P. Lyvers, et al.; IEEE Transactions on Pattern Analysis and Machine Intelligence, vol. 11, No. 12; Dec. 1989.

"Subpixel Precision Corner Detection and Localization"; Robert M. Haralick, et al.; URL: http://haralick.org/conferences/Subpixel_Corner.pdf; retrieved on Apr. 27, 2018.

"A Fast Subpixel Edge Detection Method Using Sobel-Zernike Moments Operator"; Qu Ying-Dong, et al.; Image and Vision Computing 23, pp. 11-17; 2005.

"Recovering and Characterizing Image Features Using an Efficient Model Based Approach"; Thierry Blaszka, et al.; RR-2422, INRIA; 1994.

YouTube video entitled "Assisted Camera Calibration"; URL: https://youtu.be/3SWX1iQRbsg; Uploaded by user BoofCV; Uploaded to YouTube on Jun. 5, 2016; Screenshots included.

"Flexible and User-Centric Camera Calibration using Planar Fiducial Markers"; S. Daftry, et al.; Proceedings of the British Machine Vision Conference; pp. 19.1-19.13; Jan. 2013.

"Survey of Optical Indoor Positioning Systems"; R. Mautz, et al.; 2011 International Conference on Indoor Positioning and Indoor Navigation (IPIN); Sep. 21-23, 2011; IEEE.

YouTube Video entitled "Our Road to Self-Driving Vehicles | Uber ATG"; uploaded on Sep. 19, 2017; screenshots included; URL: https://youtu.be/27OuOCeZmwI; retrieved on Sep. 28, 2017.

"Fiducial Marker Detection Using FPGAs"; Peter Samarin, et al.; Sep. 28, 2013.

"Digital Camera Calibration Methods: Considerations and Comparisons"; Fabio Remondino, et al.; ISPRS Commission V Symposium 'Image Engineering and Vision Metrology'; Nov. 2005.

"Camera Calibration Without Feature Extraction"; Luc Robert; Research Report RR-2204, INRIA; 1994.

"Precise Ellipse Estimation Without Contour Point Extraction"; Jean-Nicolas Ouellet, et al.; Machine Vision Applications, vol. 21, Issue 1, pp. 59-67; Oct. 12, 2009.

"A Robust Hough Transform Algorithm for Determining the Radiation Centers of Circular and Rectangular Fields with Subpixel Accuracy"; Weiliang Du, et al.; Physics in Medicine & Biology, vol. 54, No. 3; Jan. 6, 2009.

\* cited by examiner

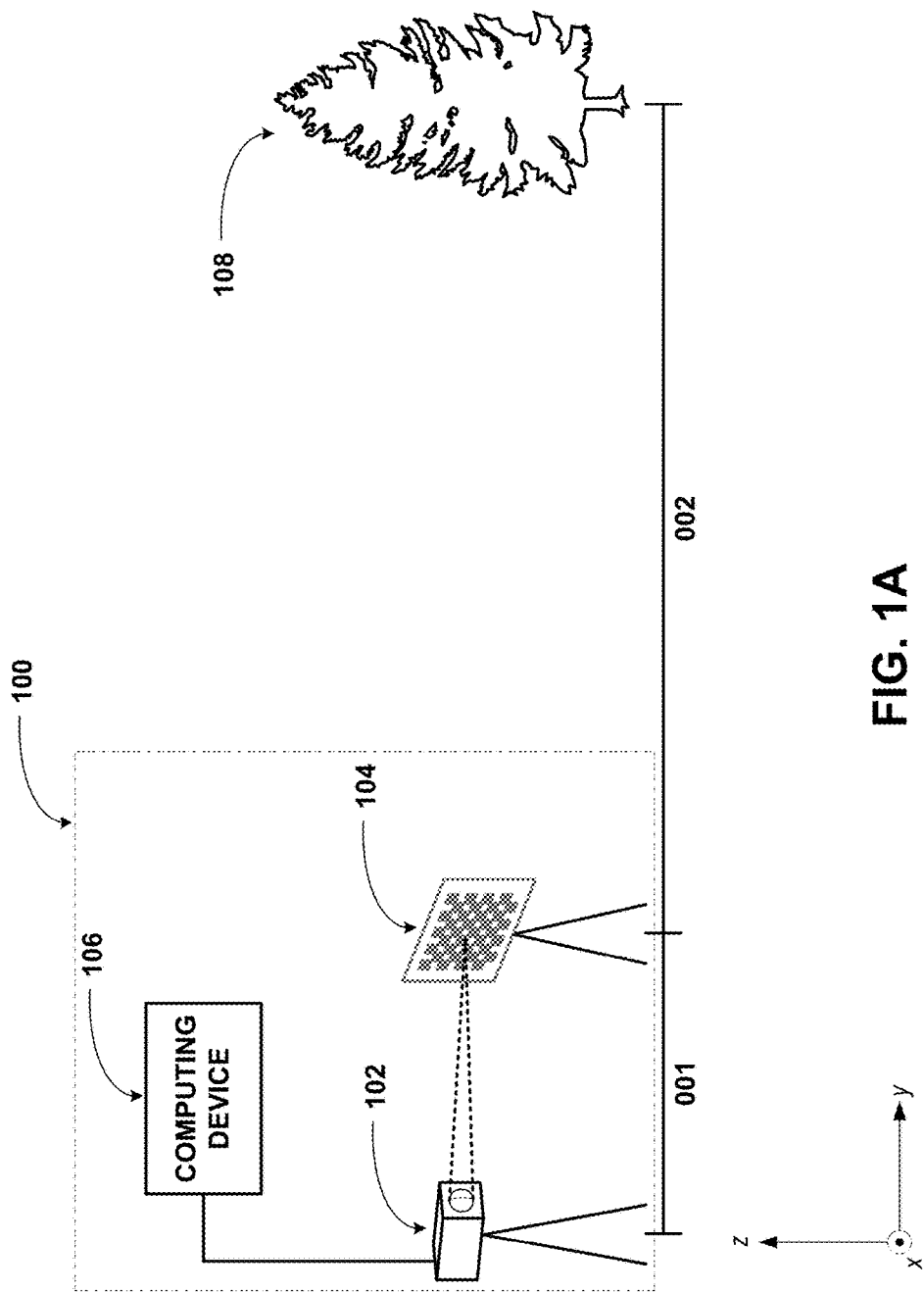

MULTISTAGE CAMERA CALIBRATION

BACKGROUND

Unless otherwise indicated herein, the materials described in this section are not prior art to the claims in this application and are not admitted to be prior art by inclusion in this section.

Light detection and ranging (LIDAR) devices may estimate distances to objects in a given environment. For example, an emitter subsystem of a LIDAR system may emit near-infrared light pulses, which may interact with objects in the LIDAR system's environment. At least a portion of the light pulses may be redirected back toward the LIDAR (e.g., due to reflection or scattering) and detected by a receiver subsystem. Conventional receiver subsystems may include a plurality of detectors and a corresponding controller configured to determine an arrival time of the respective light pulses with high temporal resolution (e.g., ~400 ps). The distance between the LIDAR system and a given object may be determined based on a time of flight of the corresponding light pulses that interact with the given object.

In addition, cameras can be used to identify objects within a scene. However, to improve the precision with which a camera identifies objects within a scene, the camera may be calibrated. Such a calibration can provide a correlation of the appearance of a captured image to the spatial layout of a physical scene. Further, calibration can correct for defects in the fabrication and/or assembly of a camera used to capture images. For example, if an aperture of a camera is off-center with respect to an image sensor of the camera, a calibration may correct for this (e.g., using a processor that provides a correction to captured images such that they more accurately reflect a physical scene).

One method of calibrating cameras includes applying a pinhole camera model. The pinhole camera model assumes the camera undergoing calibration is an ideal pinhole camera (i.e., a camera with no lenses and a point-like aperture). Using the pinhole camera model approximation, the coordinates (e.g., in three-dimensions) of a physical scene may be mapped to a projection on a two-dimensional plane, where the projection on the two-dimensional plane is represented by a captured calibration image. The location of the pinhole aperture in the theoretical pinhole camera can be determined based on the calibration image. Other parameters of the theoretical pinhole camera can also be determined (e.g., focal length). Determining the location of the pinhole aperture and accounting for it may include calculating one or more elements of a camera matrix based on one or more calibration images.

Other methods of calibration can be employed to correct for other defects inherent in optical design or due to fabrication/assembly, as well. For example, one or more distortion coefficients can be calculated based on a captured calibration image. The distortion coefficients may be used to account for optical non-uniformities arising due to a lens in the camera (e.g., barrel distortions, mustache distortions, pincushion distortions, etc.). In addition, other optical aberrations can be accounted for (e.g., defocusing, tilting, spherical aberrations, astigmatism, coma, chromatic aberrations, etc.). The OpenCV library of functions contains multiple commands that can be used for calibrating cameras (e.g., cameras for use in computer vision applications).

SUMMARY

The disclosure relates to methods and systems for multistage camera calibration. In some embodiments, a camera calibrated using the multistage camera calibration may further be used to calibrate other devices (e.g., one or more LIDAR devices or radar devices). The multistage camera calibration may include setting up a calibration target at a given distance relative to the camera, focusing the camera on the calibration target, and then capturing a first image of the calibration target using the camera. Next, the multistage camera calibration may include focusing the camera on an object of interest that is at a greater distance from the camera than the calibration target. As such, the calibration target may no longer be in focus. Then, a second image of the calibration target may be captured by the camera. Both images of the calibration target (the first image with the calibration target in focus and the second image with the calibration target out of focus) may be transmitted to a computing device. Using a corner-detection algorithm, the computing device may identify one or more locations of calibration points in the first image having the calibration target in focus. Further, using a corner-refinement algorithm and based on the one or more locations of calibration points identified in the image of the calibration target that is in focus, the computing device may determine one or more locations of calibration points in the second image having the calibration target out of focus. Based on the one or more locations of calibration points in the second image, the computing device may determine one or more imperfections in the image sensor and/or the lens of the camera. These determined imperfections can be accounted for in future images captured by the camera (e.g., future images captured by the camera with the object of interest in focus).

In one aspect, a method is provided. The method includes positioning a calibration target relative to a camera such that a separation between the calibration target and the camera corresponds to a focal length of the camera. The method also includes capturing, by the camera, a focused image of the calibration target. Further, the method includes determining one or more approximate locations of calibration points of the calibration target within the focused image of the calibration target. In addition, the method includes adjusting the focal length of the camera such that the adjusted focal length of the camera is greater than the separation between the calibration target and the camera. Still further, the method includes capturing, by the camera, an unfocused image of the calibration target. Additionally, the method includes determining, based on the one or more approximate locations of calibration points of the calibration target within the focused image of the calibration target, one or more refined locations of calibration points of the calibration target within the unfocused image of the calibration target. Yet further, the method includes correcting for one or more optical aberrations within the camera based on the one or more refined locations of calibration points of the calibration target.

In another aspect, a non-transitory, computer-readable medium is provided. The non-transitory, computer-readable medium has instructions stored thereon, wherein the instructions, when executed by a processor, cause the processor to perform functions including receiving a focused image of a calibration target positioned relative to a camera such that a separation between the calibration target and the camera corresponds to a focal length of the camera. The focused image of the calibration target was captured by the camera. The functions also include determining one or more approximate locations of calibration points of the calibration target within the focused image of the calibration target. Further, the functions include receiving an unfocused image of the calibration target. The unfocused image of the calibration target was captured by the camera with an adjusted focal length. The adjusted focal length of the camera is greater than the separation between the calibration target and the camera. In addition, the functions include determining, based on the one or more approximate locations of calibration points of the calibration target within the focused image of the calibration target, one or more refined locations of calibration points of the calibration target within the unfocused image of the calibration target. Still further, the functions include correcting for one or more optical aberrations within the camera based on the one or more refined locations of calibration points of the calibration target.

In an additional aspect, a system is proved. The system includes a calibration target. The system also includes a camera positioned relative to the calibration target such that a separation between the calibration target and the camera corresponds to a focal length of the camera. The camera is configured to capture a focused image of the calibration target. The camera is also configured to capture an unfocused image of the calibration target. The unfocused image of the calibration target is captured by the camera with an adjusted focal length. The adjusted focal length of the camera is greater than the separation between the calibration target and the camera. Further, the system includes a computing device. The computing device is configured to receive the focused image of the calibration target and the unfocused image of the calibration target. The computing device is also configured to determine one or more approximate locations of calibration points of the calibration target within the focused image of the calibration target. Further, the computing device is configured to determine, based on the one or more approximate locations of calibration points of the calibration target within the focused image of the calibration target, one or more refined locations of calibration points of the calibration target within the unfocused image of the calibration target. Additionally, the computing device is configured to correct for one or more optical aberrations within the camera based on the one or more refined locations of calibration points of the calibration target.

In yet another aspect, a system is provided. The system includes a means for positioning a calibration target relative to a camera such that a separation between the calibration target and the camera corresponds to a focal length of the camera. The system also includes a means for capturing, by the camera, a focused image of the calibration target. Further, the system includes a means for determining one or more approximate locations of calibration points of the calibration target within the focused image of the calibration target. In addition, the system includes a means for adjusting the focal length of the camera such that the adjusted focal length of the camera is greater than the separation between the calibration target and the camera. Still further, the system includes a means for capturing, by the camera, an unfocused image of the calibration target. Additionally, the system includes a means for determining, based on the one or more approximate locations of calibration points of the calibration target within the focused image of the calibration target, one or more refined locations of calibration points of the calibration target within the unfocused image of the calibration target. Even further, the system includes a means for correcting for one or more optical aberrations within the camera based on the one or more refined locations of calibration points of the calibration target.

These as well as other aspects, advantages, and alternatives will become apparent to those of ordinary skill in the art by reading the following detailed description, with reference, where appropriate, to the accompanying drawings.

BRIEF DESCRIPTION OF THE DRAWINGS

FIG. 1A is an illustration of a system, according to example embodiments.

FIG. 7A is an illustration of a calibration target, according to example embodiments.

FIG. 7B is an illustration of a calibration target, according to example embodiments.

DETAILED DESCRIPTION

Figure 1B:
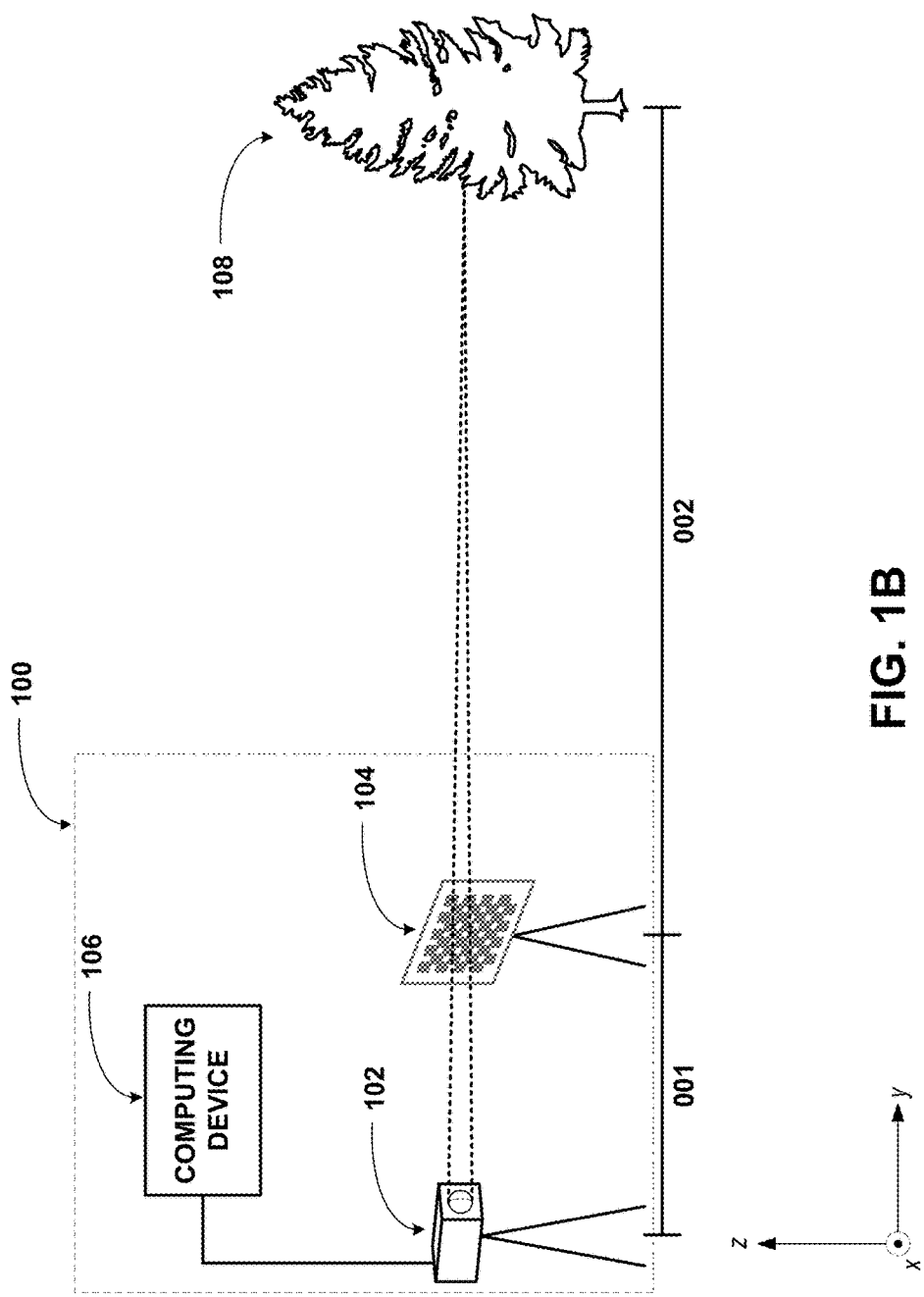
FIG. 1B is an illustration of a system, according to example embodiments.

Example methods and systems are contemplated herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the figures should not be viewed as limiting. It should be understood that other embodiments might include more or less of each element shown in a given figure. Further, some of the illustrated elements may be combined or omitted. Yet further, an example embodiment may include elements that are not illustrated in the figures.

I. Overview

For a variety of applications (e.g., computer vision applications), a conventional camera calibration may be performed such that images captured by a camera accurately reflect a scene. Some conventional camera calibrations may include producing a calibration target with calibration points located thereon. The physical location of each of the calibration points on the calibration target may be known or measured prior to the camera calibration being performed. Then, to calibrate the camera, the camera may capture a calibration image of the target and compare locations of the calibration points in the calibration image to their physical locations on the calibration target. Discrepancies between the calibration points in the calibration image and the physical locations on the calibration target can indicate aberrations present within the camera (e.g., a distortion of a lens of the camera).

Such a conventional calibration may be performed by positioning the calibration target at a calibration distance from the camera that is approximately the same as a distance between the camera and a desired range at which the camera will capture images of objects after calibration is complete (e.g., in order to perform object recognition of the objects using computer vision techniques). A focal length of the camera (e.g., a focal length of the lens of the camera) may also be adjusted to match the calibration distance. Further, the calibration target may be sized such that the calibration target occupies a large portion of the field of view of the camera when the calibration target is separated from the camera by the calibration distance. If the calibration target occupies a large portion of the field of view of the camera, a large portion of the camera (e.g., a large portion of the lens of the camera) can be evaluated and/or calibrated, for example.

The above-described conventional technique of a single calibration target and a one or more calibration images to correct for aberrations in the camera can be difficult or impractical, however, if the desired calibration distance is large (e.g., greater than 50 meters, greater than 100 meters, greater than 500 meters, greater than 1 kilometer, etc.). In some cases, it can be difficult to find an unoccluded space of that size to perform a calibration. Further, to result in the calibration target occupying a large portion of the field of view of the camera at such a large calibration distance, the calibration target may be undesirably large (e.g., a calibration target that is 15 meters by 5 meters or greater in area). Such a calibration target may be infeasible to construct, assemble, transport, and/or position relative to the camera. For example, it can be difficult to produce a calibration target of such a size to the requisite level of precision needed for calibration.

Example embodiments contemplated herein relate to alternative techniques for calibrating a camera. The embodiments contemplated herein may calibrate a camera without encountering some of the pitfalls described above (e.g., a large, unoccluded space for calibration and/or a large calibration target). After a camera is calibrated according to techniques contemplated herein, the camera may then be used to calibrate other devices (e.g., transmitters and/or receivers in a LIDAR system). One example technique includes a method. The method may include multiple stages.

In one stage of the calibration, a camera may be positioned at a first distance relative to a calibration target. The calibration target may have a series of calibration points with known physical locations printed thereon (e.g., each calibration point may be indicated by a fiducial marker). Further, the calibration target may occupy a significant portion of the field of view of the camera when positioned at the first distance. In addition, a focal length of the camera (e.g., a focal length of a lens of the camera) may be set such that the focal length is equal to the first distance. The camera may then capture a first image of the calibration target. Because the calibration target is in focus in this calibration image, the first image of the calibration target may be referred to as a "focused image of the calibration target." Thereafter, the focused image of the calibration target may be transmitted to a computing device for analysis.

In an additional stage of the calibration, the camera remains positioned at the first distance relative to the calibration target (e.g., with the calibration target at the same orientation relative to the camera). Thus, the calibration target still occupies the significant portion of the field of view of the camera. However, the focal length of the camera (e.g., the focal length of the lens of the camera) may be set such that the focal length is equal to a second distance, where the second distance is greater than the first distance. The second distance may be equal to the distance of an object of interest. Additionally or alternatively, the second distance may be equal to a desired distance for which the camera is to be calibrated (e.g., because the camera will be used to detect objects at the desired distance after the camera calibration). The camera may then capture a second image of the calibration target. Because the calibration target is out of focus (e.g., blurry) in this calibration image, the second image of the calibration target may be referred to as an "unfocused image of the calibration target." Thereafter, the unfocused image of the calibration target may be transmitted to the computing device for analysis.

In another stage of the calibration, the computing device may determine one or more aberrations in the camera (e.g., in a lens of the camera, an aperture of the camera, etc.) by evaluating the focused image of the calibration target and the unfocused image of the calibration target. The computing device may determine approximate locations of calibration points in the focused image of the calibration target (e.g., by a processor of the computing device executing a corner-detection algorithm stored within a data storage of the computing device). These approximate locations of calibration points may be accurate to the nearest horizontal pixel and nearest vertical pixel of the focused image of the calibration target. Then, based on the approximate locations of calibrations points, the computing device may determine refined locations of calibration points in the unfocused image of the calibration target (e.g., by the processor of the computing device executing a corner-refinement algorithm stored within the data storage of the computing device). The refined locations of calibration points may have subpixel accuracy. This may result in the identification of calibration points within a calibration image that was captured using a camera focused to a much longer focal distance while still having the calibration target occupy a large portion of the field of view of the camera.

In a further stage of the calibration, the computing device may then compare the refined locations of calibration points to expected locations of the calibration points on the calibration target. The expected locations of the calibration points may be based on an orientation of the calibration target relative to the camera, the distance of the calibration target relative to the camera, and/or the known physical locations of the calibration points on the calibration target.

In some embodiments, the expected locations of the calibration points may be stored in the data storage of the computing device (e.g., in a list or an array). Any differences between the determined refined locations and the expected locations of the calibration points may then be used to identify one or more aberrations within the camera (e.g., by determining a camera matrix associated with the camera based on a pinhole camera model and/or by determining distortion coefficients associated with the camera). The identified aberrations within the camera can be corrected and/or accounted for (e.g., by physically modifying the camera or by image processing future images captured by the camera).

The calibrated camera may then be used to calibrate other devices. For example, images of a scene may be captured by the camera and compared to three-dimensional maps of the scene generated a LIDAR system (e.g., using the camera as an effective "ground truth" for a calibration of the LIDAR system). The LIDAR system may be used for object detection and/or navigation in an autonomous vehicle or a vehicle operating in an autonomous mode or semi-autonomous mode, for example. Further, a discrepancy between the images captured by the camera and the three-dimensional map generated by the LIDAR system may indicate one or more aberrations in the LIDAR system (e.g., aberrations in a transmitter and/or receiver of the LIDAR system). Such indicated aberrations in the LIDAR system may then be corrected and/or accounted for (e.g., by adjusting one or more optics in the transmitter and/or receiver of the LIDAR system).

II. Example Systems

The following description and accompanying drawings will elucidate features of various example embodiments. The embodiments provided are by way of example, and are not intended to be limiting. As such, the dimensions of the drawings are not necessarily to scale.

FIG. 1A is an illustration of a system 100, according to example embodiments. The system 100 may include a camera 102, a calibration target 104, and a computing device 106. As illustrated, the camera 102 may be positioned at a first distance 001 away from the calibration target 104. Also as illustrated, the calibration target 104 may be positioned at a second distance 002 away from an object of interest 108.

The camera 102 may be a camera that is used for detecting objects within a scene (e.g., the object of interest 108). For example, the camera may be a component of an object detection and identification system used in a computer vision application (e.g., in a robot or an autonomous vehicle). Alternatively, the camera 102 may be used solely as a calibration tool (e.g., to serve as "ground truth" for the calibration of a different device or system). In such embodiments, upon completion of a calibration method, another sensing device (e.g., a radar detector or a LIDAR detector) may be positioned, adjusted, or otherwise altered based on additional calibration images captured using the calibrated camera 102.

In some embodiments, the camera 102 may include a digital camera (e.g., a camera that stores images electrically or magnetically as a series of bits). Such a digital camera may include one or more an image sensors, such as charge-coupled devices (CCD) and/or complementary metal-oxide-semiconductor (CMOS) image sensors. Additionally or alternatively, the camera 102 may include a film camera (i.e., a camera that stores images chemically on a strip of photographic film). The camera 102 may be a still camera or a video camera. In some embodiments, the camera 102 may be capable of functioning as both a still camera and a video camera, depending on operating settings of the camera 102 (e.g., as selected by a user of the camera 102).

In addition, the camera 102 may include one or more additional optical components. For example, the camera 102 may include one or more lenses that can be used to adjust a focal point of light entering the camera 102 from the scene. In some embodiments, the camera 102 may include one or more mirrors to modify a light path within the camera 102 (e.g., to direct light from the scene to an image sensor within the camera 102). Still further, the camera 102 may include other optics such as a polarization filter, a neutral-density filter, an aperture (e.g., implemented using an iris), a chromatic filter, etc. Any of the optical components within the camera 102 may be adjustable, removable, and/or interchangeable, in various embodiments.

The calibration target 104 may be captured by the camera 102 in calibration images and used to calibrate the camera 102. In such calibration images, the calibration target 104 may occupy a substantial portion of a field of view of the camera 102 (e.g., 5%, 10%, 25%, 50%, 55%, 60%, 65%, 70%, 75%, 80%, 85%, 90%, 95%, or 99% of the field of view of the camera 102). The calibration target 104 may have fiducial markers printed, painted, or otherwise placed thereon. The fiducial markers may be used to identify multiple calibration points on the calibration target 104. These calibration points may be precisely defined on the calibration target 104 such that their exact positions is known a priori to the performance of a calibration method (e.g., a calibration method as contemplated herein). That way, any deviations of the apparent positions of the calibration points in calibration images from the known positions of the calibration points can be identified.

As illustrated, the calibration target 104 may include a checkerboard pattern. In other embodiments, there may be more or fewer fiducial markers arranged on the calibration target 104. An increased number of fiducial markers 104 may increase the resolution with which the calibration of a camera can be performed. Alternatively, a reduced number of fiducial markers 104 may increase the speed at which the calibration of a camera can be performed and/or reduce computing resources used to perform a calibration.

In alternate embodiments, the fiducial markers may have various other shapes (e.g., a circular shape, a triangular shape, a rectangular shape, a pentagonal shape, a hexagonal shape, a heptagonal shape, an octagonal shape, a nonagonal shape, a decagonal shape, etc.). Further, different fiducial markers on the same calibration target may have different shapes. Additionally or alternatively, fiducial markers in some embodiments may have special optical properties (e.g., a fiducial marker may be holographic or may only be detectable using light of a specific wavelength range). Other example fiducial markers and calibration targets are described with reference to FIGS. 7A-7D below.

Figure 1C:
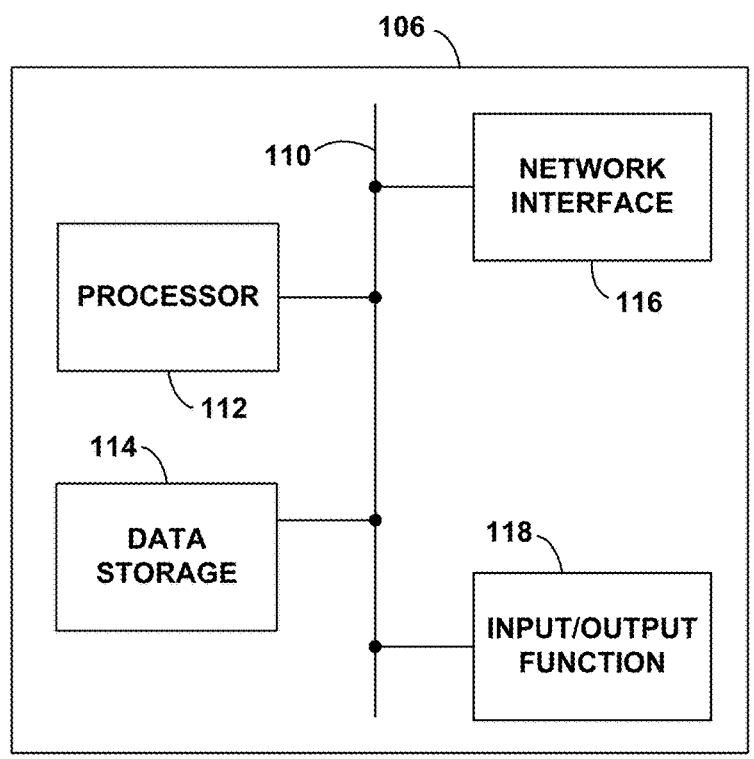
FIG. 1C is an illustration of a computing device, according to example embodiments.

The computing device 106 may be used to calibrate the camera 102. In order to perform such a calibration, the computing device 106 may include a variety of components, as illustrated in FIG. 1C. FIG. 1C is a simplified block diagram exemplifying a computing device 106, illustrating some of the functional components that could be included in a computing device arranged to operate in accordance with the embodiments contemplated herein. Example computing device 106 could be a desktop computing device, laptop computing device, mobile computing device, tablet computing device, server computing device, or some other type of computing device, in various embodiments.

As illustrated in FIG. 1C, the computing device 106 may include a processor 112, a data storage 114, a network interface 116, and an input/output function 118, all of which may be coupled by a system bus 110 or a similar mechanism. The processor 112 may include one or more central processing units (CPUs), such as one or more general purpose processors and/or one or more dedicated processors (e.g., application specific integrated circuits (ASICs), digital signal processors (DSPs), network processors, field-programmable gate arrays (FPGAs), etc.). In some embodiments, the computing device 106 may be located remotely from the camera 102 (e.g., the computing device 106 may be a cloud computing device or a networked computing device).

The data storage 114, in turn, may include volatile memory (e.g., random access memory (RAM)) and/or non-volatile memory (e.g., a hard drive, read-only memory (ROM), programmable read-only memory (PROM), erasable programmable read-only memory (EPROM), electrically erasable programmable read-only memory (EEPROM), non-volatile random-access memory (such as flash memory), a solid state drive (SSD), a hard disk drive (HDD), a compact disc (CD), a digital video disk (DVD), a digital tape, a read/write (RW) CD, an R/W DVD, etc.). As such, the data storage 114 may include a non-transitory, computer-readable medium. Further, the data storage 114 may be integrated in whole or in part with processor 112. In some embodiments, the data storage 114 may store program instructions, executable by the processor 112, and data that may be manipulated by these program instructions to carry out the various methods, processes, or operations contemplated herein. Alternatively, these methods, processes, or operations can be defined by hardware, firmware, and/or any combination of hardware, firmware, and software.

The network interface 116 may include one or more wireline connections, such as an Ethernet connection or a universal serial bus (USB) connection. Additionally or alternatively, the network interface 116 may include one or more wireless interfaces, such as IEEE 802.11 (WIFI®), BLUETOOTH®, BLUETOOTH LOW ENERGY (BLE®), cellular technology (e.g., GSM, CDMA, UMTS, EV-DO, WiMAX, or LTE®), dedicated short range communications (DSRC), communication protocols described in IEEE 802.15.4 (e.g., ZIGBEE®), or a wide-area wireless connection. Other forms of physical layer connections and other types of standard or proprietary communication protocols may be used over the network interface 116.

The input/output function 118 may facilitate user interaction with the computing device 106. Further, the input/output function 118 may include multiple types of input devices, such as a keyboard, a mouse, a touch screen, etc. Similarly, the input/output function 118 may include multiple types of output devices, such as a screen, monitor, printer, one or more light-emitting diodes (LEDs), etc. Additionally or alternatively, the computing device 106 may support remote access from another device, via the network interface 116 or via another interface (not shown), such as a high-definition multimedia interface (HDMI) port.

In some embodiments, the computing device 106 may include one or more remote computing devices deployed in a networked architecture. The exact physical location, connectivity, and configuration of the remote computing devices may be unknown and/or unimportant. Accordingly, in some embodiments, the computing device 106 may be referred to as a "cloud-based" device that may be housed at various remote locations.

The object of interest 108 may be located at a given calibration distance from the camera 102. The calibration distance may correspond to 001+002 (i.e., the first distance plus the second distance), as illustrated in FIG. 1A. The object of interest 108 may be an object that the camera 102 is ultimately being calibrated to detect. For example, if the camera 102 is being used in computer vision, the object of interest 108 may be whatever object the computer vision system is presently attempted to identify (e.g., a tree, a pedestrian, a street sign, a road, etc.).

In some embodiments, the object of interest 108 may be a dummy object located at a distance from the camera 102 that corresponds to a distance for which the camera is being calibrated. For example, the camera 102 may be undergoing calibration such that images captured by the camera 102 at distance 001+002 are not distorted. In such a case, what type of object the object of interest 108 is might not matter. In some embodiments, there may be no object of interest 108 in the scene at all, but rather, the camera 102 may be calibrated based on a known calibration distance of 001+002 (i.e., the first distance plus the second distance). In such embodiments, the camera 102 may simply be focused to a distance of 001+002, even though there is no object located at that location.

The arrangement illustrated in FIG. 1A may correspond to a first stage in a multistage camera calibration method. As illustrated, the camera 102 may be focused on the calibration target 104 (i.e., the focal length of the camera 102 may be equal to the first distance 001). To achieve such a focus, a lens of the camera 102 may be modified. The focal length of the lens may be modified manually (e.g., by an operator of the camera 102 who modifies a physical separation between the lens and an image sensor of the camera 102) or in an automated fashion (e.g., using an auto-focus capability of the camera). In alternate embodiments, the lens may be swapped out, rather than adjusted. For example, the lens of the camera 102 may be replaced with a lens having a given focal length (e.g., a focal length equal to the first distance 001). Alternatively, to achieve such a focus of the camera 102, the camera 102 may be physically moved relative to the calibration target 104 such that the camera 102 is closer to or farther from the calibration target 104 until the calibration target 104 is in focus. This could again be performed manually (e.g., by an operator of the camera 102) or in an automated fashion (e.g., the camera 102 could be mounted on an automated stage or dolly that can move the camera 102 until the calibration target 104 is in focus).

Figure 1D:
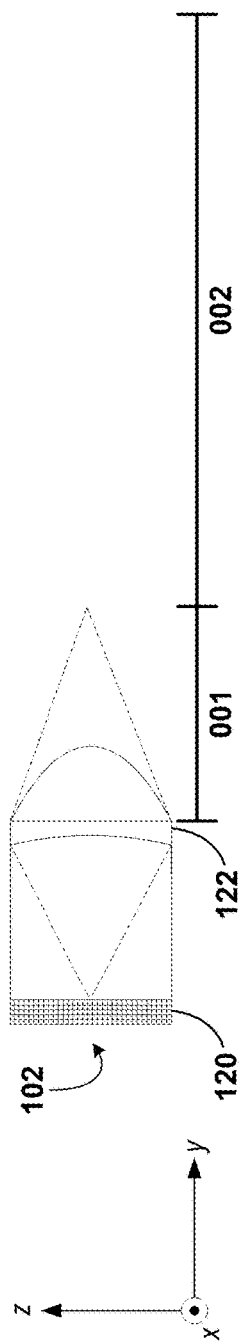
FIG. 1D is an illustration of a lens arrangement, according to example embodiments.

FIG. 1D illustrates an example embodiment of the camera 102 after being focused on the calibration target 104. As illustrated, the camera 102 may include an image sensor 120 and a first lens 122. Also as illustrated, the focal length of the camera 102 is equal to the first distance 001. The first lens 122 may have been adjusted in order to obtain a focal length of the camera 102 that corresponds to the first distance 001, for example. Alternatively, the first lens 122 may be static (e.g., may be unadjustable). In such embodiments, the first lens 122 may have been added to the camera 102 or swapped in (e.g., in place of a different lens) in order to obtain a focal length of the camera 102 that corresponds to the first distance 001.

Figure 2A:
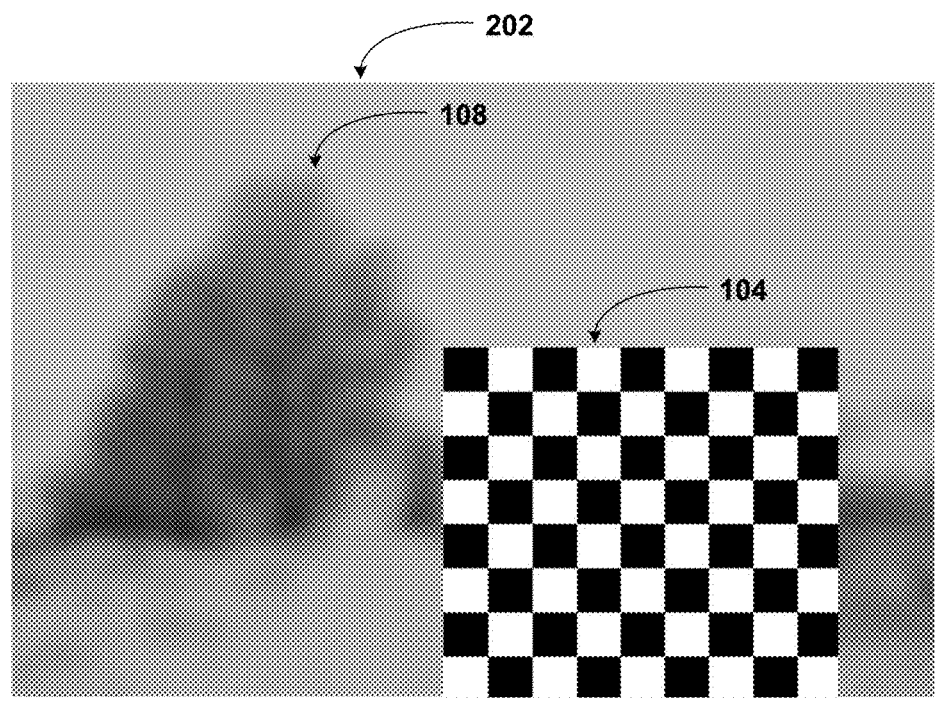
FIG. 2A is an illustration of a calibration image, according to example embodiments.

With the calibration target 104 in focus and the object of interest 108 in the background, a calibration image of the calibration target 104 may be captured by the camera 102. Because the calibration target 104 may be in focus in this calibration image, this calibration image may be referred to herein as "the focused image of the calibration target." An example embodiment of the focused image of the calibration target 202 is illustrated in FIG. 2A. As illustrated, the calibration target 104 is in focus in the foreground and the object of interest 108 is out of focus in the background (and therefore blurry). As illustrated, the calibration target 104 may occupy about 25% of the field of view of the camera 102. This may constitute a substantial portion of the field of view of the camera 102. In other embodiments, the calibration target 104 may occupy more or less than 25% of the field of view of the camera 102 (e.g., 1%, 5%, 10%, 15%, 20%, 30%, 35%, 40%, 45%, 50%, 55%, 60%, 65%, 70%, 75%, 80%, 85%, 90%, 95%, or 99% of the field of view of the camera 102).

The focused image of the calibration target 202 may be transmitted from the camera 102 to the computing device 106, for example. Upon transmitting the focused image of the calibration target 202 to the computing device 106, while transmitting the focused image of the calibration target 202 to the computing device 106, or prior to transmitting the focused image of the calibration target 202 to the computing device 106, the focal length of the camera 102 may be adjusted.

Adjusting the focal length of the camera 102 may result in a different component of a scene surrounding the camera 102 to be in focus. FIG. 1B is an illustration of the system 100, according to example embodiments, with the camera 102 having a different focal length (e.g., after the focal length of the camera 102 was adjusted). As illustrated, the focal length of the camera 102 may be adjusted such that the object of interest 108 is in focus (i.e., the focal length of the camera 102 may be equal to the first distance 001 plus the second distance 002). In addition to or instead of adjusting the focus of the camera 102, a lens of the camera 102 may be modified. The focal length of the lens may be modified manually (e.g., by an operator of the camera 102) or in an automated fashion (e.g., using an auto-focus capability of the camera 102). In alternate embodiments, the lens may be swapped out, rather than adjusted. For example, the lens of the camera 102 may be replaced with a lens having a longer focal length (e.g., the lens may approximate a collimator in some embodiments, such as embodiments having an object of interest 108 that is at a large distance from the camera 102, thereby causing a long focal length lens to be used). In some embodiments, the position of the calibration target 104 relative to the camera 102 may be maintained while adjusting the focus (e.g., the distance between the calibration target 104 and the camera 102 may be equal to the first distance 001). Additionally or alternatively, the position of the object of interest 108 relative to the camera 102 may be maintained while adjusting the focus (e.g., the distance between the calibration target 104 and the camera 102 may be equal to the first distance 001 plus the second distance 002).

Figure 1E:
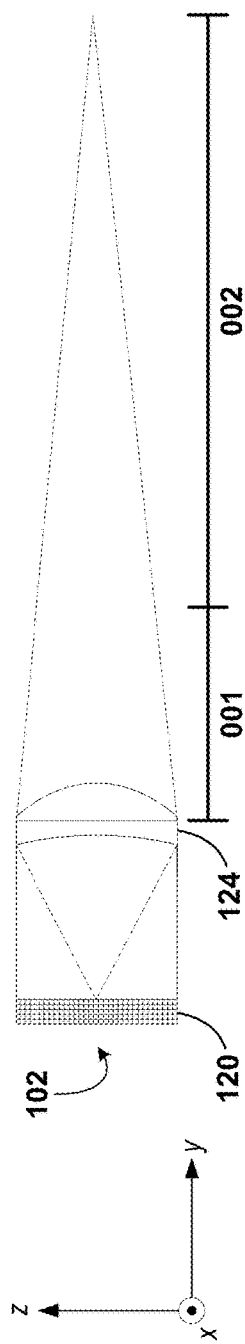
FIG. 1E is an illustration of a lens arrangement, according to example embodiments.

FIG. 1E illustrates an example embodiment of the camera 102 after being focused on the object of interest 108. As illustrated, the camera 102 may include the image sensor 120 and a second lens 124. Also as illustrated, the focal length of the camera 102 is equal to the first distance 001 plus the second distance 002. The second lens 124 may be a different conformation or position of the first lens 122 illustrated in FIG. 1D. In other words, the second lens 124 may be the same physical lens as the first lens 122 (e.g., the same piece of glass or plastic), but just moved to a different position or angle within the camera 102 and/or bent/stretched in a different fashion within the camera 102. Additionally or alternatively, the second lens 124 may have been added to the camera 102 or swapped in (e.g., replacing the first lens 122) in order to obtain a focal length of the camera 102 that corresponds to the first distance 001 plus the second distance 002. Further, the second lens 124 may be static (e.g., may be unadjustable), in some embodiments.

Figure 2B:
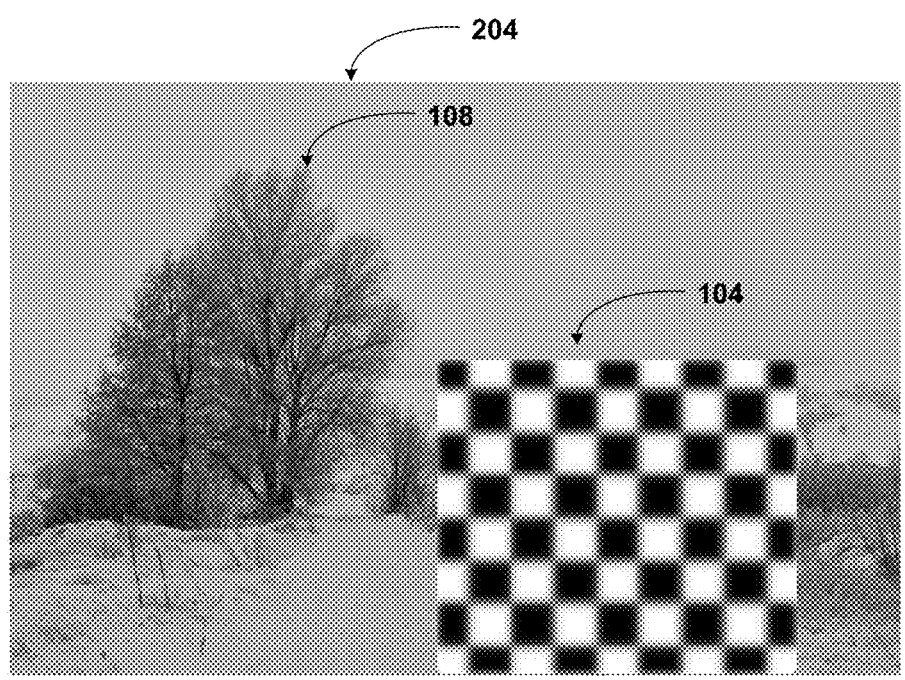
FIG. 2B is an illustration of a calibration image, according to example embodiments.

With the calibration target 104 in the foreground and the object of interest 108 in focus, a calibration image of the calibration target 104 may again be captured by the camera 102. Because the calibration target 104 may be out of focus (e.g., blurry) in this calibration image, this calibration image may be referred to herein as "the unfocused image of the calibration target." An example embodiment of the unfocused image of the calibration target 204 is illustrated in FIG. 2B. As illustrated, the calibration target 104 is out of focus in the foreground (and therefore blurry) and the object of interest 108 is in focus in the background. As illustrated, the calibration target 104 may occupy about 25% of the field of view of the camera 102, as reflected in the unfocused image of the calibration target 204. This may constitute a substantial portion of the field of view of the camera 102. In other embodiments, the calibration target 104 may occupy more or less than 25% of the field of view of the camera 102 (e.g., 1%, 5%, 10%, 15%, 20%, 30%, 35%, 40%, 45%, 50%, 55%, 60%, 65%, 70%, 75%, 80%, 85%, 90%, 95%, or 99% of the field of view of the camera 102).

The unfocused image of the calibration target 204 may also be transmitted from the camera 102 to the computing device 106, for example. In various embodiments, the unfocused image of the calibration target 204 may be transmitted to the computing device 106 before, together with, or after the focused image of the calibration target 202.

In still other embodiments, in order to capture the unfocused image of the calibration target 204, rather than adjusting the camera 102 so that it has a focal length of the first distance 001 plus the second distance 002, the camera 102 may instead be focused to infinity or to a point at such a far distance that it approximates infinity. Such embodiments may be used when the object of interest 108 is located at a large distance from the camera 102 (e.g., greater than 50 meters, greater than 100 meters, greater than 500 meters, greater than 1 kilometers, greater than 5 kilometers, etc.) or when the distance for which the camera 102 is being calibrated is very large (e.g., distances greater than 50 meters, greater than 100 meters, greater than 500 meters, greater than 1 kilometers, greater than 5 kilometers, etc.) compared with the first distance 001 (i.e., the distance between the camera 102 and the calibration target 104). For example, in such embodiments, the distance 001 may be between between 5 meters and 10 meters, between 10 meters and 20 meters, between 20 meters and 30 meters, between 30 meters and 40 meters, between 40 meters and 50 meters, etc.

Figure 1F:
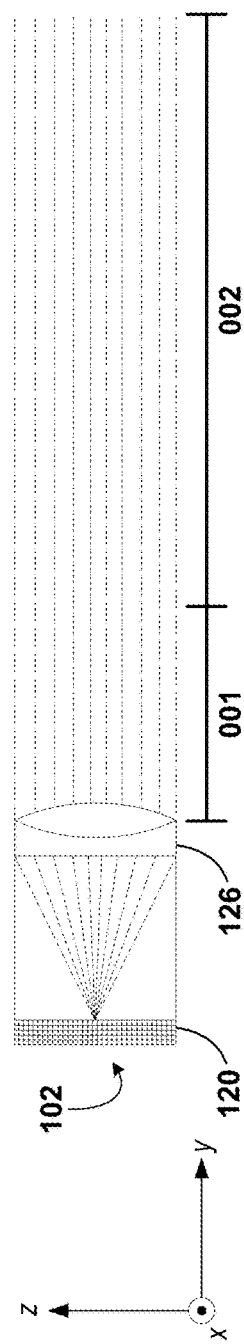
FIG. 1F is an illustration of a lens arrangement, according to example embodiments.

Focusing the camera 102 to infinity or a location that approximates infinity can done by swapping in a lens that has a long focal length. Alternatively, as illustrated in FIG. 1F, a collimator 126 can be inserted into the camera 102 in place of or in addition to a lens. The collimator 126 may include a curved mirror and/or a curved lens. For example, a parabolic lens may be used to focus parallel light from the scene onto a small point of the light detector 120 of the camera 102, thereby approximating a lens having infinite focal length.

The captured calibration images (e.g., the focused image of the calibration target 202 and the unfocused image of the calibration target 204) may be used to evaluate features of the camera 102 (e.g., distortion coefficients, camera matrices, lens position/orientation, image sensor position/orientation, aperture position/orientation, etc.). Once the features of the camera 102 are determined (e.g., based on a pinhole camera model), any defects or irregularities may be accounted for. Accounting for defects or irregularities may include modifying the aperture of the camera 102 (e.g., expanding or contracting an iris of the camera 102), adjusting the location of one or more lenses of the camera 102, adjusting the location of one or more image sensors of the camera 102, modifying the exposure time for images, changing the image resolution captured by the camera 102, or performing post-processing on images captured by the camera 102 to correct for defects/irregularities (e.g., by estimating parameters such as focal length or radial distortion to correct projections from a scene onto a captured image). Additionally or alternatively, accounting for any defects or irregularities could allow a computing device (e.g., a processor executing an object-recognition algorithm) to determine precise locations of objects (e.g., the object of interest 108) based on the apparent locations of objects (e.g., the object of interest 108) within a future calibration image captured by the camera 102.

A variety of cameras may benefit from calibration using this calibration technique. For example, cameras that are components of autonomous vehicles used for navigation or object recognition (e.g., used for computer vision) could be calibrated according to this technique. Further, cameras calibrated using this technique may have a variety of different features (e.g., varying focal lengths, lens types, image sensors, etc.). This calibration technique may be used to calibrate digital cameras (i.e., cameras that store images electrically or magnetically as a series of bits), such as digital cameras having CCDs or CMOS image sensors, or to calibrate film cameras (i.e., cameras that store images chemically on a strip of photographic film).

Figure 3A:
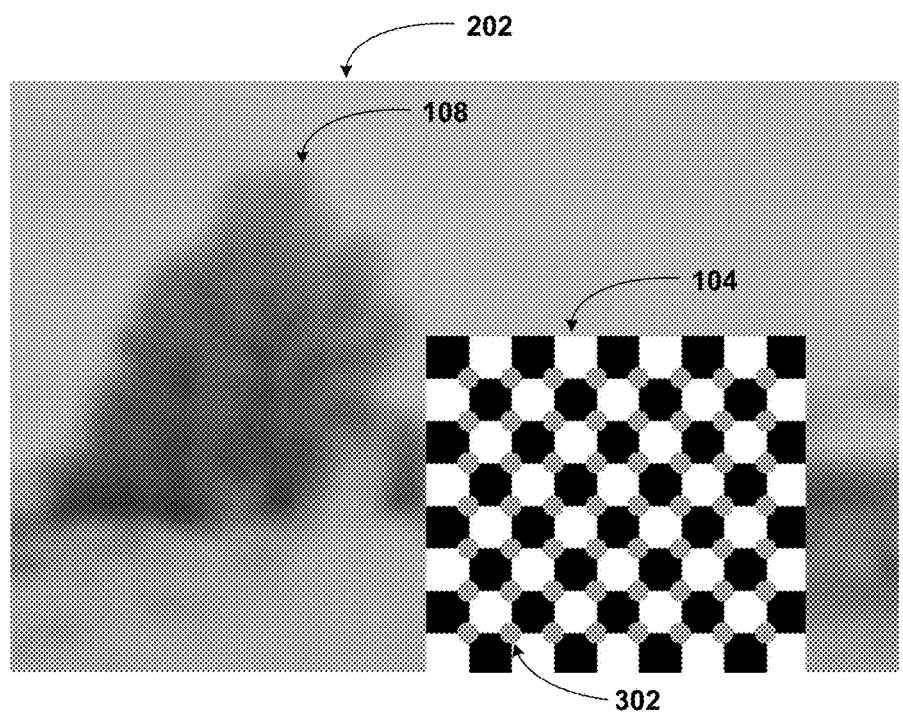
FIG. 3A is an illustration of a corner detection, according to example embodiments.

After receiving the focused image of the calibration target 202 from the camera 102, the computing device 106 may store the focused image of the calibration target 202 in the data storage 114. Further, the computing device 106 may perform a portion of a calibration process. The portion of the calibration process may include determining approximate locations 302 of one or more calibration points of the calibration target 104 within the focused image of the calibration target 202. As illustrated in FIG. 3A, the approximate locations 302 of the one or more calibration points may correspond to corners or intersection points of fiducial markers on the calibration target 104 (e.g., corners of a checkerboard pattern). Additionally or alternatively, the approximate locations 302 being determined may correspond to edges or corners of fiducial markers on the calibration target 202.

The approximate locations 302 may be determined by the computing device 106 using a calibration point determination algorithm. For example, the data storage 114 may include a corner-detection algorithm if the fiducial markers of the calibration target within the focused image of the calibration target 202 are arranged into a checkerboard pattern, as in the embodiment of FIG. 3A. The corner-detection algorithm may include one or more of the following, for example: a Moravec corner-detection algorithm, a Harris and Stephens corner-detection algorithm, a Plessey corner-detection algorithm, a Shi-Tomasi corner-detection algorithm, a Förstner corner-detection algorithm, a multi-scale Harris operator, a Wang and Brady corner-detection algorithm, a smallest univalue segment assimilating nucleus (SUSAN) corner-detection algorithm, a Trajkovic and Hedley corner-detection algorithm, and a corner-detection algorithm based on features determined by an accelerated segment test (AST). Other corner-detection and/or edge-detection algorithms may be included. Such a corner-detection algorithm may be executed by the processor 112 on the focused image of the calibration target 202 to determine one or more approximate locations 302 of the calibration points. Each of the approximate locations 302 may include a horizontal location (e.g., to the nearest pixel) and a vertical location (e.g., to the nearest pixel) of a respective calibration point within the focused image of the calibration target 202. In some embodiments, the corner-detection algorithm may include the findChessboardCorners ( ) command in the OpenCV library (e.g., if the calibration target 202 includes a checkerboard pattern).

Alternatively, the approximate locations 302 may be determined using a human-in-the-loop procedure. For example, the focused image of the calibration target 202 may be displayed by the input/output function 118 of the computing device 106. Then, based on inputs received from a user (e.g., a point and click, a touch on a touchscreen, an audible command, a gesture command, etc.), the computing device 106 may receive an indication of where one or more of the approximate locations 302 is within the focused image of the calibration target 202.

Figure 3B:
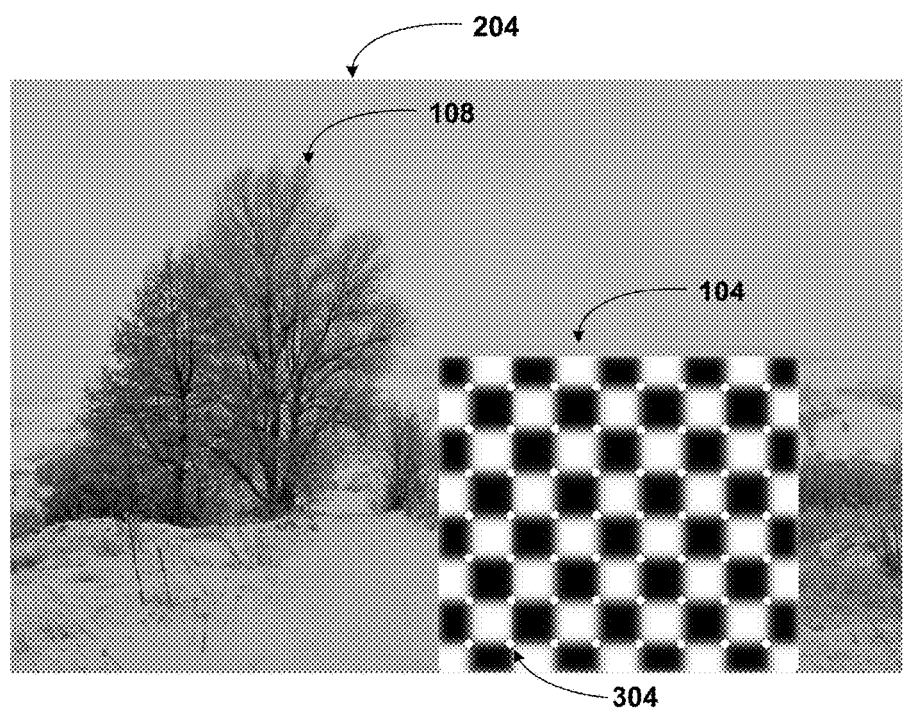
FIG. 3B is an illustration of a corner refinement, according to example embodiments.

Further, after receiving the unfocused image of the calibration target 204 from the camera 102, the computing device 106 may store the unfocused image of the calibration target 204 in the data storage 114. In addition, the computing device 106 may perform an additional portion of a calibration process. The additional portion of the calibration process may include determining refined locations 304 of the one or more calibration points of the calibration target 104 within the unfocused image of the calibration target 204. As illustrated in FIG. 3B, the refined locations 304 of the one or more calibration points may correspond to corners or intersection points of fiducial markers on the calibration target 104. Additionally or alternatively, the refined locations 304 being determined may correspond to edges or corners of fiducial markers on the calibration target 104.

Still further, the refined locations 304 may be determined based on the one or more approximate locations 302 of the one or more calibration points that were determined using the focused image of the calibration target 202 (e.g., in addition to basing the refined locations 304 on the unfocused image of the calibration target 204). Alternatively, the refined locations 304 may be determined by the computing device 304 based on one or more human-in-the-loop selections. For example, the unfocused image of the calibration target 204 may be displayed by the input/output function 118 of the computing device 106. Then, based on inputs received from a user (e.g., a point and click, a touch on a touchscreen, an audible command, a gesture command, etc.), the computing device 106 may receive an indication of the approximate locations of calibration points within the unfocused image of the calibration target 204. The computing device 106 may then determine the refined locations 304 based on the human-selected approximate locations within unfocused image of the calibration target 204.

The refined locations 304 may be determined by the computing device 106 using a corner-refinement algorithm, in some embodiments. For example, the data storage 114 may include a corner-refinement algorithm for use with checkerboard patterns if the fiducial markers of the calibration target 104 within the unfocused image of the calibration target 204 are arranged into a checkerboard pattern, as in the embodiment illustrated in FIG. 3B. The corner-refinement algorithm stored in the data storage 114 may be executed by the processor 112 to determined the refined locations 304, for example.

In some embodiments, the corner-refinement algorithm may include the cornerSubPix( ) command in the OpenCV library. As such, in some embodiments, the refined locations 304 of the calibration points within the unfocused image of the calibration target 204 may include subpixel locations of each calibration point (e.g., a horizontal subpixel location and/or a vertical subpixel location within the unfocused image of the calibration target 204). Such subpixel locations may provide a more accurate determination of where the checkerboard corners are within the unfocused image of the calibration target 204 than are provided by integer pixel locations (e.g., as determined based on the focused image of the calibration target 202 using a corner-detection algorithm).

The cornerSubPix( ) command, or other similar commands, may include determining subpixel locations using a series of operations. One operation may include defining a series of dot products, each dot product taken between a first vector and a second vector. The first vector in each dot product may be defined as a difference between a point p that is somewhere in the vicinity of the corner location and a point q that is the integer corner location (e.g., the integer location of a corner as determined by a corner-detection algorithm using the focused image of the calibration target 202). The second vector in each dot product may be defined as the gradient of intensity (e.g., gradient of brightness intensity between white and black when using a checkerboard calibration target 104) at the point p in the vicinity of the corner location.

Each of these dot products may then be set equal to zero to create a system of equations. Assuming that the coordinates q (the location of the corner) are equal to the proper coordinates of the corner (e.g., in x and y coordinates within the unfocused image of the calibration target 204), the dot product should be equal to zero. This is because, when the point p is in a non-edge region (e.g., in a region completely surrounded by black pixels or in a region completely surrounded by white pixels within the unfocused image of the calibration target 204), the gradient of intensity is zero. Thus, the dot product will be zero because one of the vectors in the dot product is zero. In the other case, where the point p is in an edge region (e.g., in a region with black pixels on one side of the point p and white pixels on the other side of the point p), the dot product is zero because the gradient of intensity (i.e., the second vector) is perpendicular to the vector between point p and point q (i.e., the first vector), again assuming that point q is in its proper subpixel location. Using the system of equations defined by the series of dot products, the subpixel location of point q (i.e., the subpixel location of the corner) can be determined (e.g., by solving the system of equations for the point q and/or refining the subpixel coordinates of q based on each equation in the system).

This corner-refinement process can be used to determine the subpixel location of multiple corners present within the unfocused image of the calibration target 204, in some embodiments. For example, the subpixel location of each corner in a checkerboard pattern on the calibration target 104 can be determined using this corner-refinement algorithm. This or other corner-refinement algorithms may be originally intended for use with a single, focused calibration image (e.g., an image where a checkerboard calibration target is in focus). For example, the corner-refinement algorithm described above could be used to determine subpixel locations of calibration points within the focused image of the calibration target 202 based on the integer pixel locations determined using a corner-detection algorithm. However, this or other corner-refinement algorithms may be robust (i.e., can be used to yield accurate results even when the quality of the calibration image is degraded or otherwise imperfect). Hence, this or other corner-refinement algorithms can be used to determine the subpixel locations of calibration points within a blurry calibration image (e.g., within the unfocused image of the calibration target 204, when coupled with the approximate locations 302 of calibration points determined using the focused image of the calibration target 202).

Because the corner-refinement algorithm may be robust, even the corner locations within the unfocused image of the calibration target 204 can be determined to subpixel accuracy. Thus, aberrations (e.g., distortions) within the camera 102 can be identified using images captured when the camera 102 is focused to a distance equal to the first distance 001 plus the second distance 002 (i.e., to a large distance from the camera). For example, comparing the refined locations 304 (i.e., subpixel locations of the calibration points) determined within the unfocused image of the calibration target 204 that were determined using the corner-refinement algorithm to known physical locations of calibration points on the calibration target 104 (e.g., known based on the fabrication of the calibration target 104) can indicate where and to what degree distortions are present within the camera 102 (e.g., within a lens of the camera 102). Hence, using this technique, an accurate calibration for the camera 102 can be performed, even for relatively small distortions and for relatively large target distances.

The techniques contemplated herein may provide an improvement over conventional techniques that use only an in-focus image of the calibration target 104 with the calibration target 104 occupying a majority of the field of view of the camera 102. In such conventional techniques, when the calibration distance relative to the camera 102 is large (e.g., greater than 10 meters, greater than 50 meters, greater than 100 meters, greater than 200 meters, greater than 300 meters, greater than 400 meters, greater than 500 meters, greater than 1 kilometer, greater than 2 kilometers, greater than 5 kilometers, greater than 10 kilometers, etc.), in order for the calibration target 104 to occupy a majority of the field of view of the camera 102, the calibration target 104 is quite large (e.g., 15 meters by 5 meters). Such a calibration target may be difficult to fabricate, transport, and/or position prior to capturing the calibration images. However, the multistage calibration technique contemplated herein provides a technical improvement over the conventional calibration technique by allowing for the use of a smaller calibration target (e.g., by placing the calibration target closer to the camera).

In other embodiments, the refined locations 304 illustrated in FIG. 3B may be determined using methods that do not include a corner-refinement algorithm. For example, in embodiments where the calibration target 104 does not include a checkerboard pattern, other refinement algorithms may be used (e.g., a linear operator that estimates parameters of one or more ellipses present in the calibration image or a Hough transform (HT)-based computer algorithm to localize the radiation center of a circular or rectangular field with subpixel accuracy).

The calibration system 100 illustrated in FIGS. 1A and 1B and/or the calibration techniques contemplated herein may be used to calibrate cameras (e.g., the camera 102) at a fabrication facility. For example, an image sensor of the camera 102 and/or a lens of the camera 102 may be calibrated using the calibration target 104 after fabrication of the camera 102 is complete. Additionally or alternatively, the calibration target 104 may be used to calibrate one or more cameras upon assembly or installation of the cameras. For example, when an image sensor and a lens are together assembled within a housing to form a digital camera (e.g., in a laptop computer or a mobile phone), the digital camera assembly may be calibrated. In still other embodiments, the calibration target 104 may be used to calibrate the camera 102 while the camera 102 is in use. For example, if the camera 102 is being used for navigation and/or object detection and avoidance on a vehicle (e.g., on an autonomous vehicle or a vehicle operating in an autonomous or semi-autonomous mode), the calibration target 104 may be positioned at an exit of a garage, at a parking spot, on a billboard, or on the road surface itself, such that while the vehicle is in use the calibration can be performed. Such a calibration may include a validation to a previously calibrated state (i.e., a "check-up" calibration). If the camera 102 fails such a validation, the camera 102 and/or the entire vehicle may be decommissioned permanently or temporarily (e.g., until repairs are performed). If the camera 102 is decommissioned, a redundant backup camera may be employed.

In addition, the system 100 used for calibration may also include a stage that is used to translate (e.g., stepwise) and/or rotate (e.g., stepwise) the camera 102 relative to the calibration target 104 (e.g., to capture multiple calibration images from multiple camera perspectives). The stage may be controlled by the processor 112 of the computing device 106 by executing a set of instructions stored within the data storage 114, for example. The set of instructions may be executed to step the stage from one camera perspective to the next relative to the calibration target 104. The camera 102 may capture calibration images between or during each step (e.g., as controlled by the processor 112).

In still other embodiments, rather than adjusting a focal length of the camera 102 in between capturing the focused image of the calibration target 202 and the unfocused image of the calibration target 204, two separate cameras could be used. Each camera could be focused to a different depth (e.g., a first camera focused to the first distance 001 and a second camera focused to the first distance 001 plus the second distance 002). Further, each camera could then capture a calibration image of the calibration target 104 (e.g., the first camera captures a focused image of the calibration target and the second camera captures an unfocused image of the calibration target). Any difference in perspective between the two cameras could be accounted for in post-processing (e.g., by the processor 112 of the computing device 106 executing instructions stored within the data storage 114). Then, the two calibration images could be used in the same fashion as described above to determine refined locations 304 of calibration points.

Figure 4:
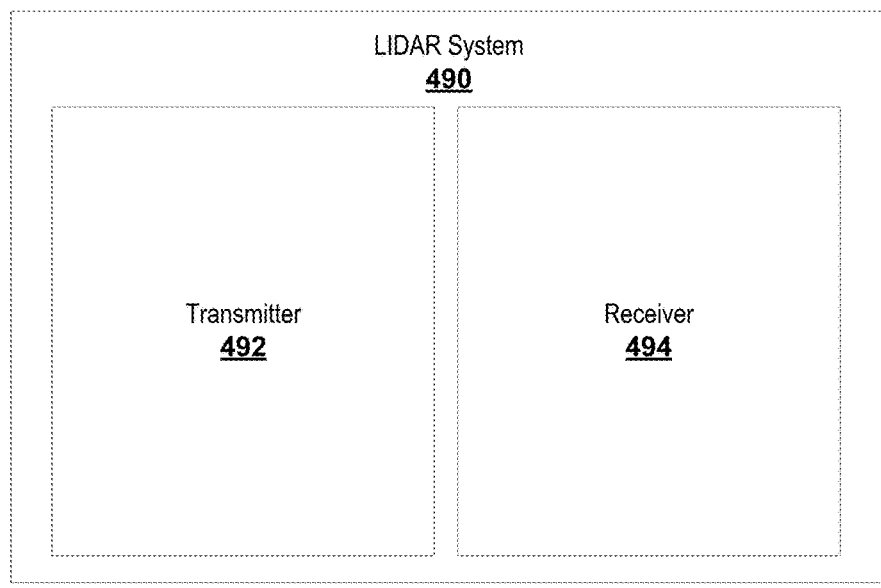
FIG. 4 is an illustration of a LIDAR system, according to example embodiments.

FIG. 4 is a block diagram illustration of a LIDAR system 490, according to example embodiments. The LIDAR system 490 includes a transmitter 492 and a receiver 494. The LIDAR system 490 may be used for navigation and/or object detection and avoidance within an autonomous vehicle (e.g., a self-driving car, an autonomous drone, an autonomous truck, an autonomous boat, an autonomous submarine, an autonomous helicopter, etc.) or a vehicle operating in an autonomous mode or a semi-autonomous mode, for example. In an example embodiment, the LIDAR system 490 could provide point cloud information, object information, mapping information, or other information to the vehicle. Alternatively, the LIDAR system 490 may be used for other computer vision purposes.

The LIDAR system 490 may be calibrated using a camera (e.g., using a camera that was previously calibrated according to the calibration techniques contemplated herein). For example, upon completion of a multistage camera calibration technique, portions of the LIDAR system 490 may be positioned, adjusted, or otherwise altered to account for calibration data determined during the multistage camera calibration.

The transmitter 492 may be configured to emit light. For example, the transmitter 492 may include a laser or an LED. The light emitted by the transmitter 492 may be modulated at a predetermined frequency, in some embodiments. Further, the light emitted by the transmitter 492 may correspond (e.g., in wavelength or polarization) to a sensitivity of the receiver 494. For example, if the receiver 494 includes a bandpass chromatic filter, the transmitter 492 may emit light of a wavelength such that the light can pass through the bandpass chromatic filter of the receiver 494.

The receiver 494 may be configured to detect light (e.g., to detect light emitted from the transmitter 492). In some embodiments, the receiver 494 may include one or more photodetectors (e.g., avalanche photodiodes (APDs) or silicon photomultipliers (SiPMs)). The receiver 494 may include components in addition to the photodetectors, such as lenses, stages, filters, a computing device, etc. As described above, the receiver 494 may be sensitive (e.g., in wavelength or polarization) to light emitted by the transmitter 492. For example, the receiver 494 may include a polarization filter that is configured to block horizontally polarized light, but pass vertically polarized light, where only vertically polarized light is emitted from the transmitter 492. In such a way, the receiver 494 can eliminate noise arising from stray light coming from sources other than the transmitter 492. In some embodiments, the receiver 494 may be configured to detect light modulated at a frequency corresponding to a modulation frequency of the transmitter 492.

In example embodiments, a signal may be emitted from the transmitter 492. The signal may be scattered by objects within a scene and consequently detected by the receiver 494 (e.g., by one or more light detectors within the receiver 494) of the LIDAR system 490 to analyze the scene (e.g., to determine the shape of an object or an object's distance from the LIDAR system 490). The LIDAR system 490 may be configured to provide information (e.g., point cloud data) about one or more objects (e.g., location, shape, etc.) in the external environment to a computer device, for example.

The LIDAR system 490 may be adjusted or modified according to data captured by a camera system (e.g., the system 100 illustrated in FIGS. 1A and 1B), in some embodiments. For example, the system 100 may be calibrated according to one or more of the camera calibration processes herein shown and described. Then, using the calibrated system 100, one or more images of a scene may be captured by the camera 102 of the system 100 from a given perspective (e.g., three-dimensional position and orientation) relative to the scene. Thereafter, the LIDAR system 490 may generate a map of the same scene from the same perspective as the perspective of the camera 102.

The map of the scene may be compared to the one or more images of the scene captured by the camera 102 to determine the accuracy of the map of the scene. Determining the accuracy of the map of the scene may include identifying any aberrations (e.g., distortions) in the LIDAR system 490 (e.g., due to imperfect optics of the transmitter 492 and/or receiver 494 in the LIDAR system 490). For example, if one or more features of the scene that appear collinear in the one or more images captured by the calibrated camera 102 appear to be non-collinear in the map of the scene generated by the LIDAR system 490, a distortion may be identified (e.g., a lens of the LIDAR system 490 may be distorted).

Based on the identified aberrations, components of the LIDAR system 490 can be adjusted to account for the aberrations (i.e., the LIDAR system 490 can be calibrated/modified). Accounting for the aberrations may include swapping out optics in the transmitter 492 for other optics (e.g., replacing an old lens or mirror with a new lens or mirror), swapping out optics in the receiver 494 for other optics (e.g., replacing an old lens or mirror with a new lens or mirror), applying a digital image processing algorithm to undo the induced aberrations in the generated map, adjusting optics in the transmitter 492, adjusting optics in the receiver 494, adding optics in the transmitter 492, adding optics in the receiver 494, adjusting the position of the transmitter 492, adjusting the position of the receiver 494, etc. In this way, imperfections in the LIDAR system 490 can be accounted for by using images captured by a calibrated system 100 as "ground truth."

The calibration techniques contemplated herein may include determining one or more distortion coefficients. Additionally or alternatively, the calibration techniques contemplated herein may include calculating one or more values in a camera matrix corresponding to the camera 102. The camera matrix may be based on a pinhole camera model for a camera, for example. In order to determine a camera matrix associated with a camera, a series of calibration images of the calibration target 104 may be captured from different perspectives. For example, as shown and described below with reference to FIGS. 5A through 5D, multiple calibration images with multiple orientations of a calibration target 104 with multiple focus conditions may be captured by the camera 102.

In some embodiments, a first calibration image of a calibration target 104 may be captured at a first angle relative to the camera and then the camera 102 may be reoriented (or the calibration target 104 may be reoriented), such that the camera 102 is at a second angle relative to the calibration target 104, and a second calibration image may be captured. In this way, two different camera angles relative to the calibration target 104 may be used (e.g., in the determination of the camera matrix). Such a method of moving/reorienting the camera 102 and/or the calibration target 104 to capture multiple calibration images may allow for the simulation of a larger calibration target using a smaller calibration target, the calibration of multiple regions of the field of view of the camera 102 using a single calibration target, and/or the calibration of multiple angles or depths relative to the camera 102 using a single calibration target.

FIGS. 5A-5D illustrate arrangements of a system 500 and an object of interest 108. The system 500 may be similar to the system 100 illustrated in FIGS. 1A and 1B. For example, the system 500 may include the camera 102, the calibration target 104, and the computing device 106. However, the system 500 may also include a first stand 502 and a second stand 504 on which the calibration target 104 can be placed. The first stand 502 and the second stand 504 may be positioned at different heights, depths, and/or angles relative to the camera 102 in various embodiments. In some embodiments, the first stand 502 and the second stand 504 may be easels, stages, platforms, or other frames to which the calibration target 104 may be temporarily or permanently affixed.

The arrangements of FIGS. 5A-5D may be used in a method of multistage calibration that includes the camera 102 capturing four calibration images, rather than two calibration images as described above. The four calibration images may subsequently be transmitted to the computing device 106 (e.g., individually or as a group). It is understood that in other embodiments, numbers of calibration images other than two and four could be used (e.g., three, five, six, seven, eight, nine, ten, or any other number of calibration images). Even further, in some embodiments, only one calibration image may be used. For example, in some embodiments, the camera 102 may have a lens that is astigmatic (i.e., a lens having different focal lengths in different directions). As such, portions of a calibration image captured by that camera 102 could be in focus while other portions of the same calibration image are out of focus. Thus, a single calibration image (e.g., of a single calibration target) could simulate a composite of the two calibration images on FIGS. 2A and 2B (e.g., both the calibration target 102 and the object of interest 108 could be in focus in the same calibration image) or a composite of the four calibration images of FIGS. 6A-6D.

Figure 5A:
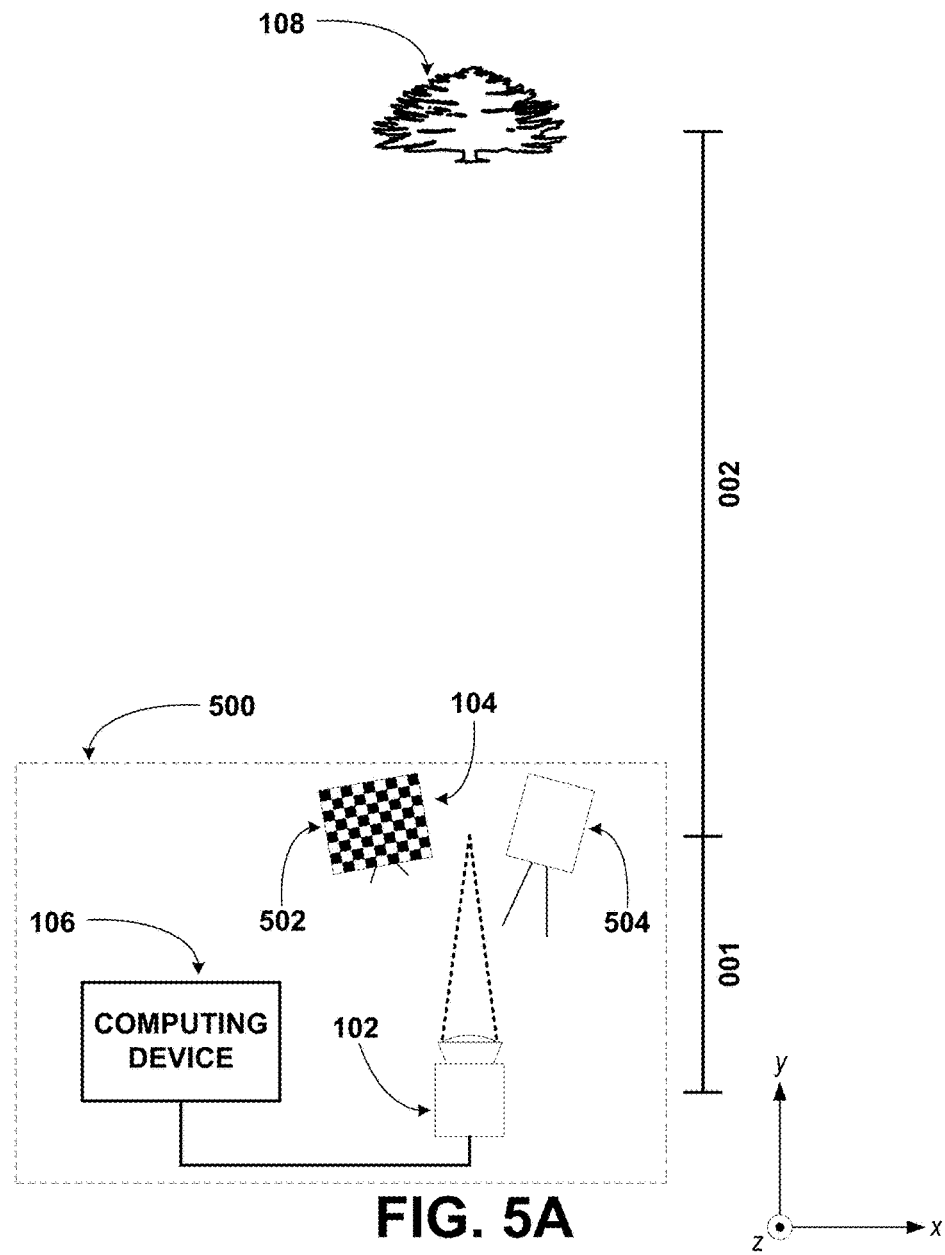
FIG. 5A is an illustration of a system, according to example embodiments.
Figure 5B:
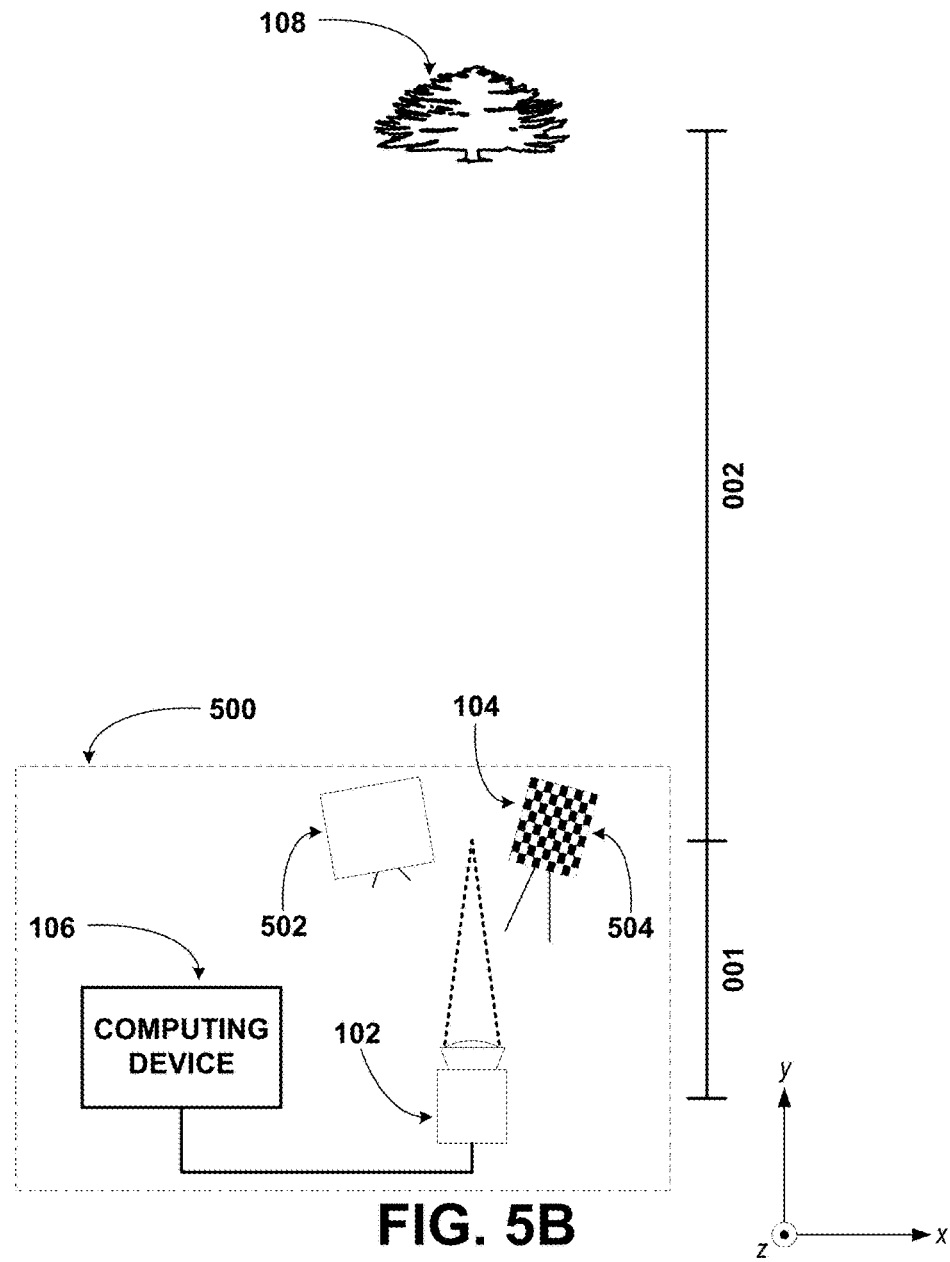
FIG. 5B is an illustration of a system, according to example embodiments.

The two arrangements illustrated in FIGS. 5A and 5B may mimic the arrangement illustrated in FIG. 1A, but with multiple angles, positions, and heights for the calibration target 104 relative to the camera 102. Similarly, the two arrangements illustrated in FIGS. 5C and 5D may mimic the arrangement illustrated in FIG. 1B, but with multiple angles, positions, and heights for the calibration target 104 relative to the camera 102. Different portions of the field of view of the camera 102 are being occupied by the calibration target 104 in the arrangements of FIGS. 5A and 5C than in the arrangements of FIGS. 5B and 5D. Thus, the arrangements of FIGS. 5A-5D may allow for the use of a smaller calibration target, for example, than the calibration target used in the arrangements FIGS. 1A and 1B. Additionally or alternatively, this may allow for the calibration of multiple angles relative to the camera 102 or of different regions of the field of view of the camera 102 using a single calibration target. Multiple angles of the calibration target 104 relative to the camera 102 may provide calibration images for use in a multiplane checkerboard calibration, for example.

Figure 6A:
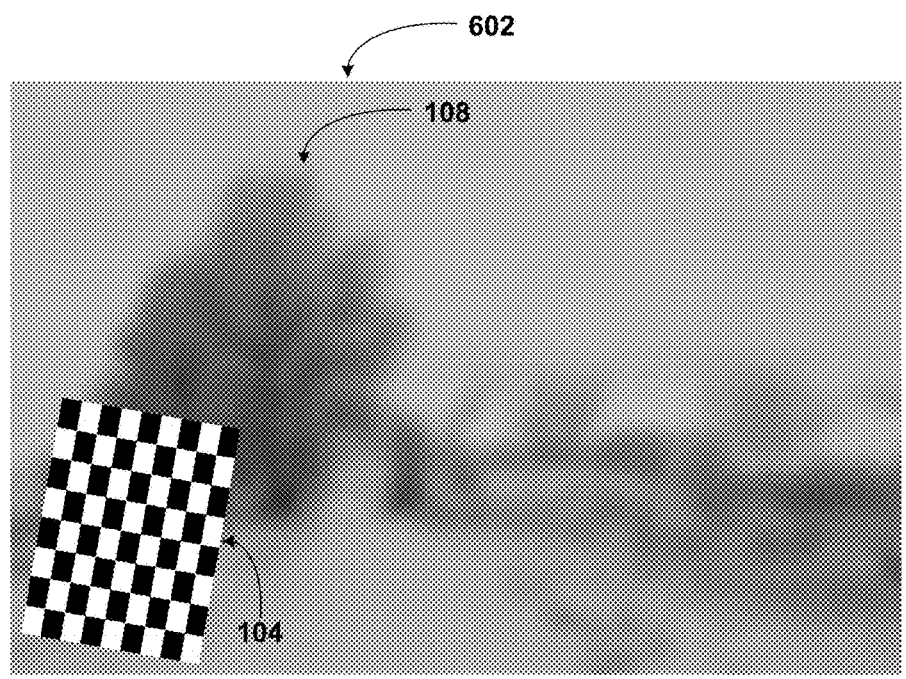
FIG. 6A is an illustration of a calibration image, according to example embodiments.

In FIG. 5A, the calibration target 104 is positioned on the first stand 502, which is at a first angle and a first depth relative to the camera 102. The first depth relative to the camera 102 may be equal to the first distance 001, for example. Further, as illustrated in FIG. 5A, the camera 102 may have a focal length equal to the first distance 001. Using the arrangement illustrated in FIG. 5A, a first calibration image may be captured by the camera 102. An example first calibration image is illustrated in FIG. 6A. Because the calibration target 104 is in focus in the first calibration image (e.g., because the focal length of the camera 102 is equal to the distance the camera 102 is from the first stand 502), the first calibration image may be referred to as the first focused calibration image 602.

Figure 6B:
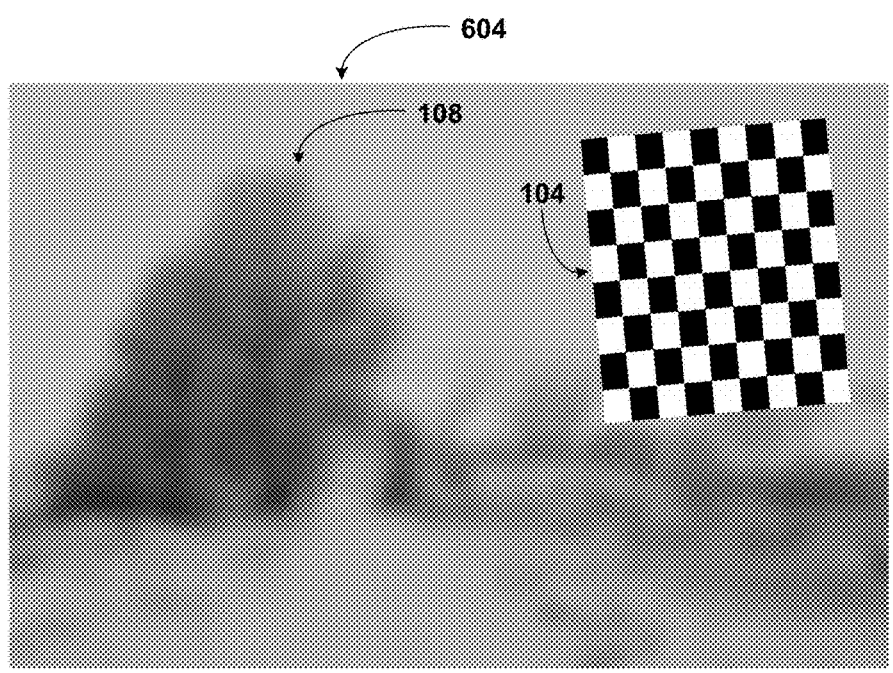
FIG. 6B is an illustration of a calibration image, according to example embodiments.

In FIG. 5B, the calibration target 104 is positioned on the second stand 504, which is at a second angle and the first depth relative to the camera 102. As described above, the first depth relative to the camera 102 may be equal to the first distance 001. Further, as illustrated in FIG. 5B, the camera 102 may have a focal length equal to the first distance 001. Using the arrangement illustrated in FIG. 5B, a second calibration image may be captured by the camera 102. An example second calibration image is illustrated in FIG. 6B. Because the calibration target 104 is in focus in the second calibration image (e.g., because the focal length of the camera 102 is equal to the distance the camera 102 is from the second stand 504), the second calibration image may be referred to as the second focused calibration image 604.

Figure 5C:
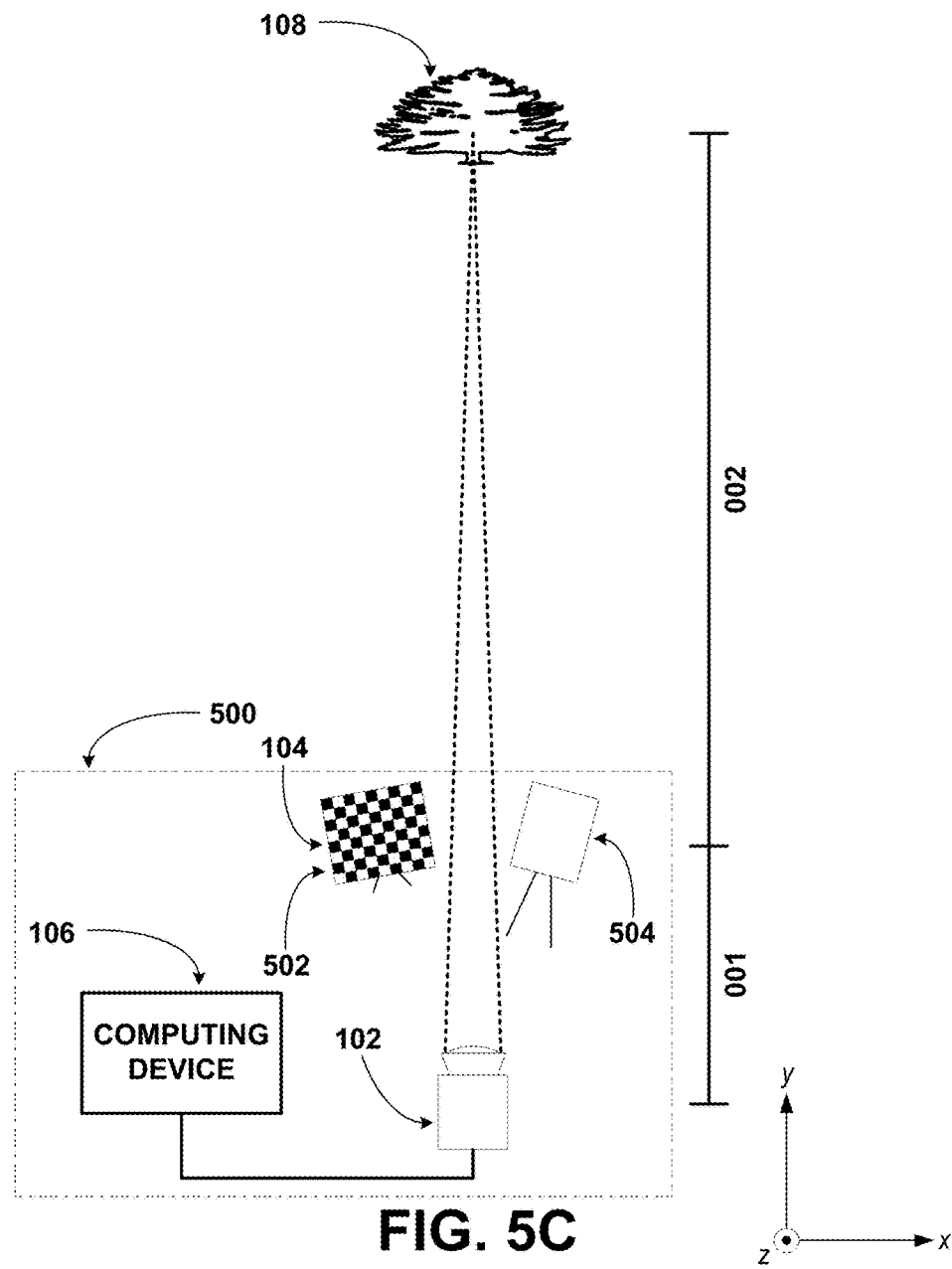
FIG. 5C is an illustration of a system, according to example embodiments.
Figure 6C:
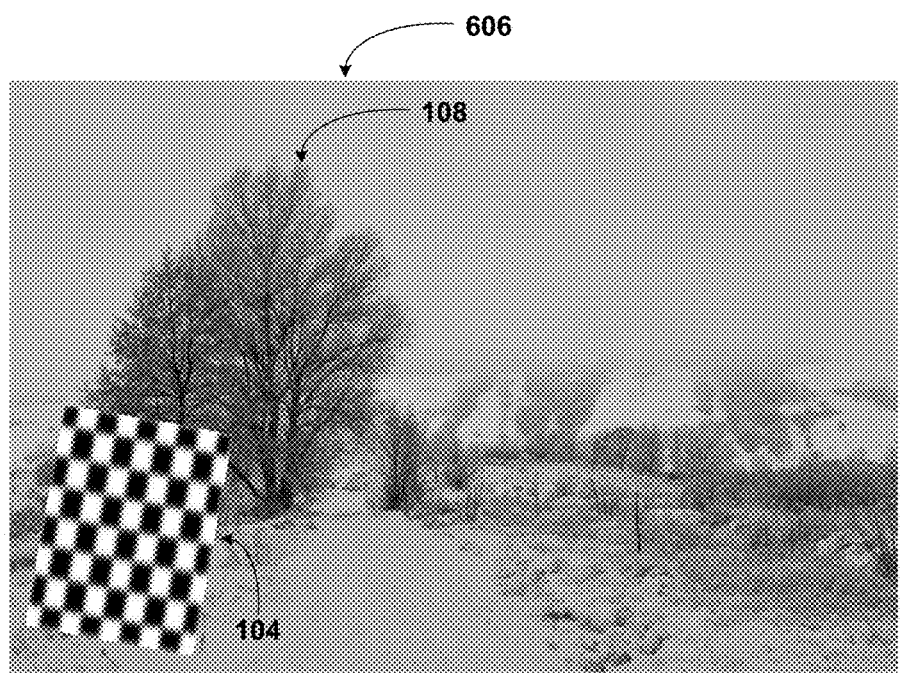
FIG. 6C is an illustration of a calibration image, according to example embodiments.

In FIG. 5C, the calibration target 104 is once again positioned on the first stand 502, which is at the first angle and the first depth relative to the camera 102. The first depth relative to the camera 102 may be equal to the first distance 001, for example. Further, the focal length of the camera 102 may be modified such that the focal length is equal to the to the first distance 001 plus the second distance 002 (e.g., the focal length of the camera 102 may be modified such that the focal length is equal to the range of the object of interest 108). Using the arrangement illustrated in FIG. 5C, a third calibration image may be captured by the camera 102. An example third calibration image is illustrated in FIG. 6C. Because the calibration target 104 is out of focus in the third calibration image (e.g., because the focal length of the camera 102 is equal to the distance the camera 102 is from the object of interest 108), the third calibration image may be referred to as the first unfocused calibration image 606.

Figure 5D:
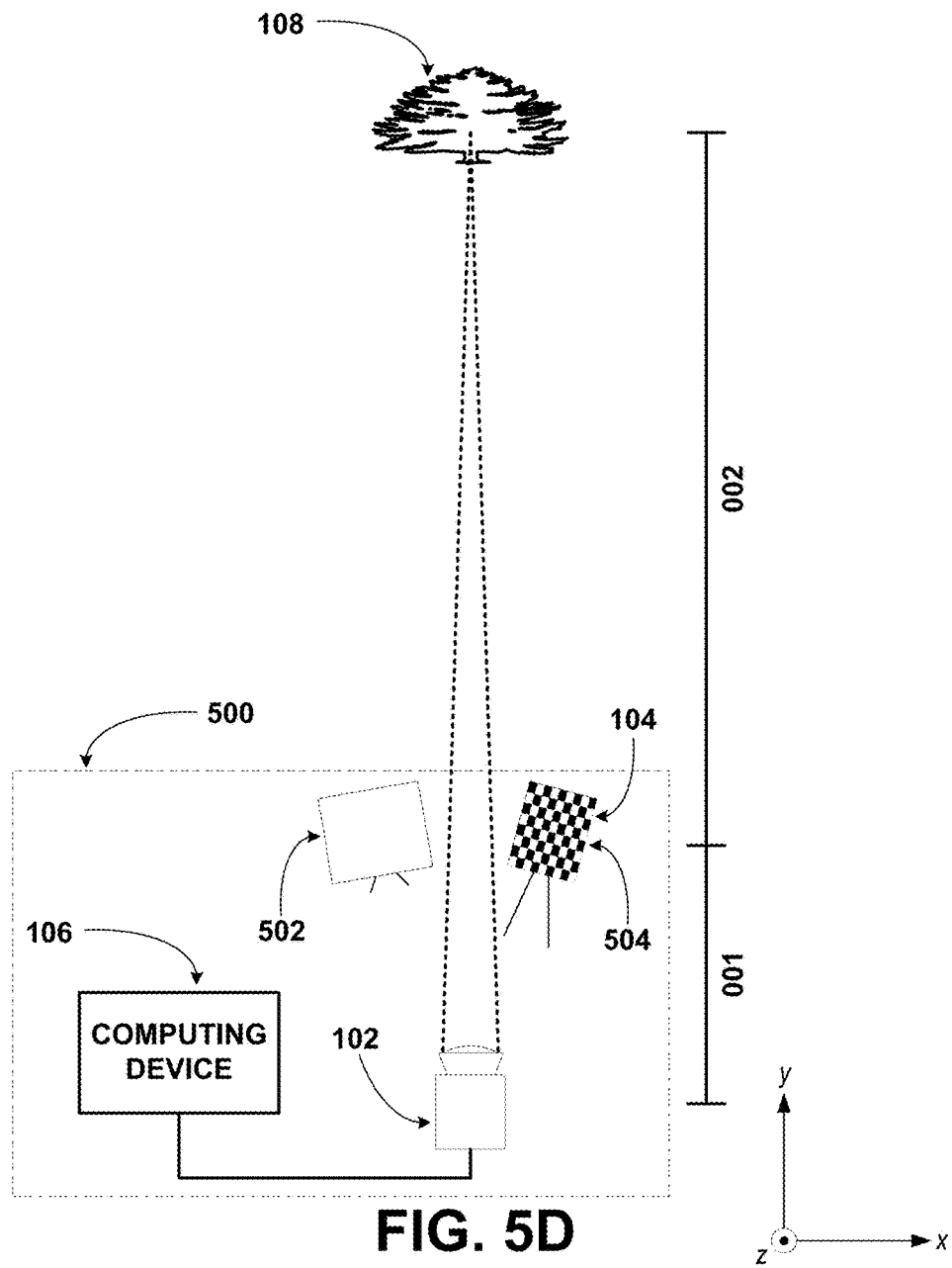
FIG. 5D is an illustration of a system, according to example embodiments.
Figure 6D:
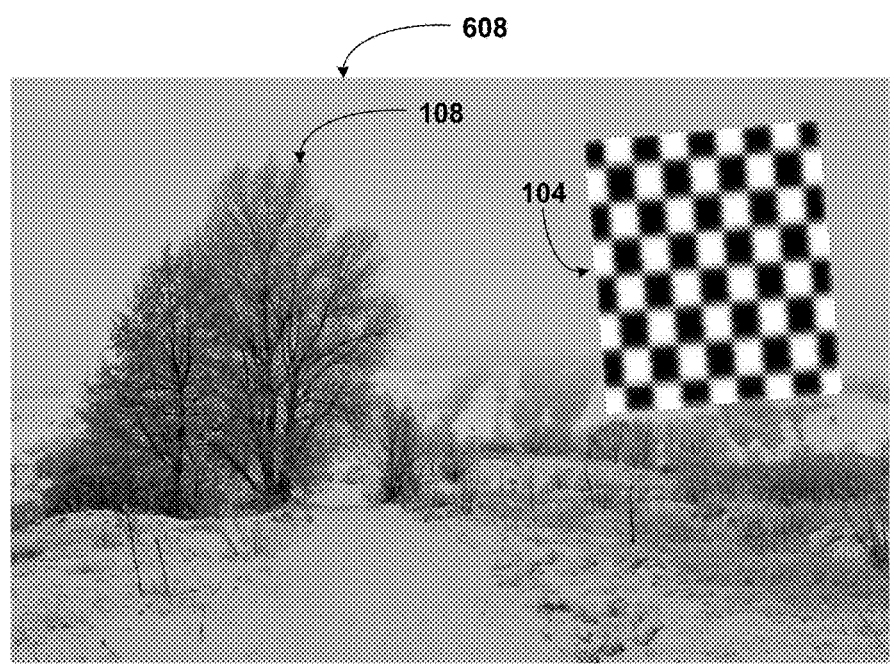
FIG. 6D is an illustration of a calibration image, according to example embodiments.

In FIG. 5D, the calibration target 104 is once again positioned on the second stand 504, which is at the second angle and the first depth relative to the camera 102. The first depth relative to the camera 102 may be equal to the first distance 001, for example. Further, the focal length of the camera 102 may be equal to the to the first distance 001 plus the second distance 002 (e.g., the focal length of the camera 102 may be equal to the range of the object of interest 108). Using the arrangement illustrated in FIG. 5D, a fourth calibration image may be captured by the camera 102. An example fourth calibration image is illustrated in FIG. 6D. Because the calibration target 104 is out of focus in the fourth calibration image (e.g., because the focal length of the camera 102 is equal to the distance the camera 102 is from the object of interest 108), the fourth calibration image may be referred to as the second unfocused calibration image 608.

After capturing the second focused calibration image 604, and prior to capturing the first unfocused calibration image 606, the focal length of the camera 102 may be adjusted (e.g., by modifying the focal length of a lens of the camera 102). As described previously with reference to FIGS. 1A and 1B, the focal length of the lens may be modified manually (e.g., by an operator of the camera 102 who modifies a physical separation between the lens and an image sensor of the camera 102) or in an automated fashion (e.g., using an auto-focus capability of the camera 102). In alternate embodiments, the lens may be swapped out, rather than adjusted. For example, the lens of the camera 102 may be replaced with a lens having a given focal length (e.g., a focal length equal to the first distance 001 plus the second distance 002).

In addition, after capturing the first focused calibration image 602, and prior to capturing the second focused calibration image 604, the calibration target 104 may be transferred from the first stand 502 to the second stand 504. Alternatively, in some embodiments, there may only be a single stand, which is moved from a first position to a second position. For example, a stand may be on a dolly or stage that is moved from the first position to the second position. Conversely, the calibration target 104 may be transferred from the second stand 504 to the first stand 502 after capturing the second focused calibration image 604, and prior to capturing the first unfocused calibration image 606. Even further, the calibration target 104 may be transferred from the first stand 502 to the second stand 504 after capturing the first unfocused calibration image 606, and prior to capturing the second unfocused calibration image 608.

While the first stand 502 and the second stand 504 are described above with respect to FIGS. 5A-5D, it is understood that in some embodiments, more than two stands may be used (e.g., three stands, four stands, five stands, six stands, seven stands, eight stands, nine stands, ten stands, etc.). In such embodiments, more than two focused calibration images may be captured by the camera 102 and/or more than two unfocused calibration images may be captured by the camera 102. For example, a focused image of the calibration target may be captured for each stand (e.g., with the calibration target 104 positioned thereon) and an unfocused image of the calibration target may be captured for each stand (e.g., with the calibration target 104 positioned thereon). In such a way, a greater portion of the field of the view of the camera 104 may be occupied by the calibration target 104 across the calibration images (e.g., without using a larger calibration target). In some embodiments, each of the focused images of the calibration target may be composited into a single focused image of the calibration target and/or each of the unfocused images of the calibration target may be composited into a single unfocused image of the calibration target. Similar to embodiments having multiple stands, in embodiments that instead include a dolly or a translatable and/or rotatable stage to capture multiple positions/orientations for the calibration target 104, more than two positions/orientations of the calibration target 104 relative to the camera may be used.

As described above, the calibration images may be captured in the following order: first focused image of the calibration target 602, second focused image of the calibration target 604, first unfocused image of the calibration target 606, and second unfocused image of the calibration target 608. In alternative embodiments, the four calibration images may be captured in a different order. For example, the calibration images may be captured in the following order: first focused image of the calibration target 602, first unfocused image of the calibration target 606, second focused image of the calibration target 604, and second unfocused image of the calibration target 608. Capturing the calibration images in such an order may reduce the number of times that the calibration target 104 is moved between the first stand 502 and the second stand 504 at the expense of increasing the number of times the focal length of the camera 102 is modified.

As described above, in some embodiments, rather than using a checkerboard pattern on the calibration target, alternative fiducial markers may be used to identify one or more calibration points on the calibration target. In some embodiments, the fiducial markers may still be shaped in such a way that a corner-detection algorithm and/or a corner-refinement algorithm can be applied to calibration images captured of a calibration target having such fiducial markers. However, in some embodiments, alternative detection algorithms and/or refinement algorithms may be used. Additionally or alternatively, the number and arrangement of the fiducial markers on a calibration target may vary across different embodiments. Further, in some embodiments, multiple different types of fiducial markers may be present on a single calibration target. Even further, the size and shape of the calibration target, itself, may be different in various embodiments. Illustrated in FIGS. 7A-7D are some example embodiments of alternate calibration targets.

Figures 7A, 7B:
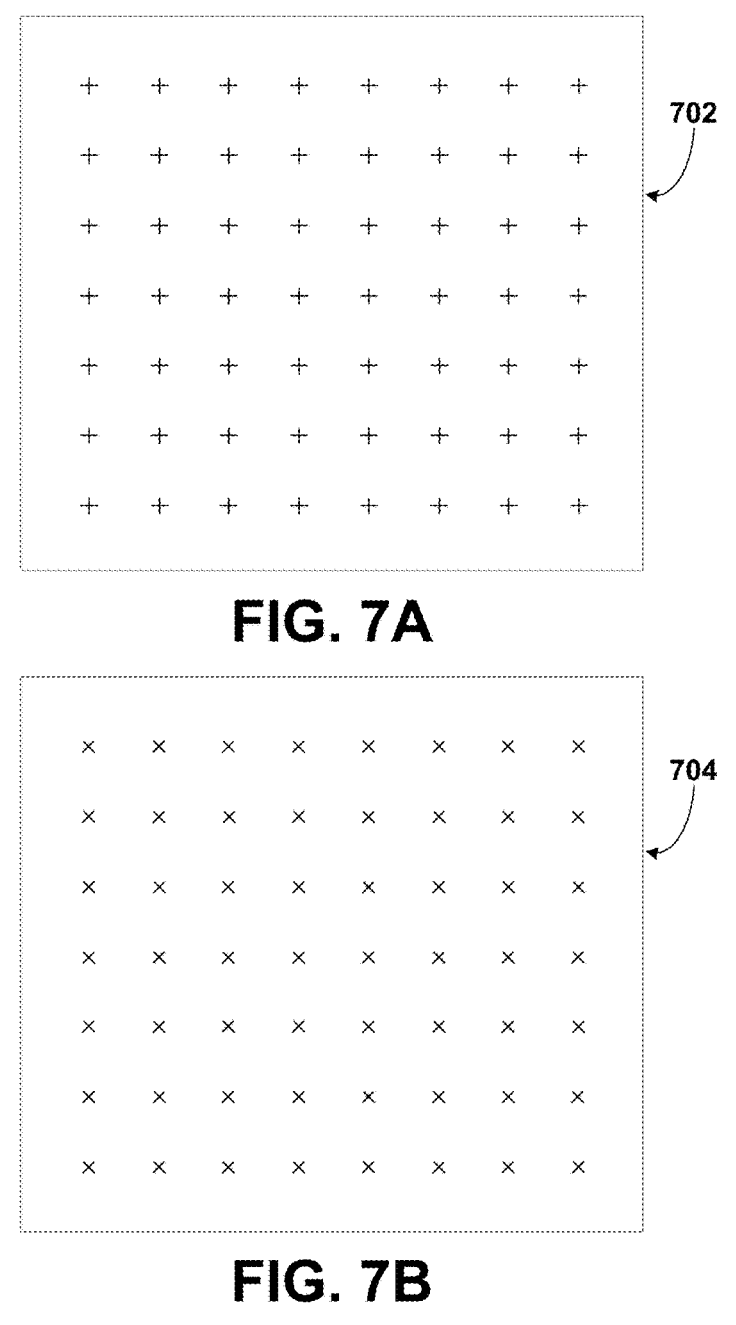

FIG. 7A is an illustration of a calibration target 702, according to example embodiments. As illustrated, the calibration target 702 may include an array of crosshairs. The crosshairs may be shaped as plus-signs. In some embodiments, the calibration target 702 illustrated in FIG. 7A may be used for calibration in addition to or instead of the checkerboard calibration target 104 illustrated in other figures.

FIG. 7B is an illustration of a calibration target 704, according to example embodiments. As illustrated, the calibration target 704 may include an array of Xs. The Xs may be shaped as plus-signs rotated by an angle of 45°. In some embodiments, the calibration target 704 illustrated in FIG. 7B may be used for calibration in addition to or instead of the checkerboard calibration target 104 illustrated in other figures.

Figure 7C:
FIG. 7C is an illustration of a calibration target, according to example embodiments.

FIG. 7C is an illustration of a calibration target 706, according to example embodiments. As illustrated, the calibration target 706 may include an array of chevrons. In some embodiments, the calibration target 706 illustrated in FIG. 7C may be used for calibration in addition to or instead of the checkerboard calibration target 104 illustrated in other figures.

Figure 7D:
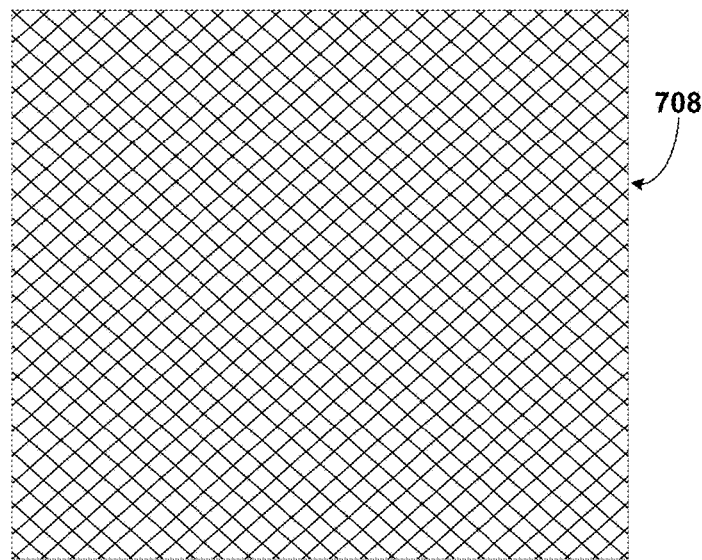
FIG. 7D is an illustration of a calibration target, according to example embodiments.

FIG. 7D is an illustration of a calibration target 708, according to example embodiments. As illustrated, the calibration target 708 may include an array of intersecting lines. Each of the intersecting lines may be at a 45° angle relative to the orientation of the calibration target 708 itself, for example. In other embodiments, the intersecting lines may instead be oriented horizontally and vertically with respect to the calibration target 708 itself. In some embodiments, the calibration target 708 illustrated in FIG. 7D may be used for calibration in addition to or instead of the checkerboard calibration target 104 illustrated in other figures.

In alternate embodiments, rather than using a single, stationary calibration target (e.g., as illustrated in FIGS. 1A and 1B) or a single calibration target moved between multiple locations (e.g., as illustrated in FIGS. 5A-5D), multiple calibration targets may be used in calibration techniques as shown and described herein.

In some embodiments, multiple instances of identical calibration targets may be used. For example, two instances of the checkerboard calibration target 104 illustrated in FIGS. 5A and 5B may be used. In such embodiments, one of instance of the calibration target 104 may be positioned on the first stand 502 and one instance of the calibration target 104 may be positioned on the second stand 504. Then, the camera 102 can capture a focused image of the two calibration targets simultaneously (e.g., using a focal length equal to the first distance 001). Such a focused image of the two calibration targets can be a composite of the first focused image of the calibration target 602 illustrated in FIG. 6A and the second focused image of the calibration target 604 illustrated in FIG. 6B. As such, a single focused calibration image can replace two calibration images in calibration methods herein shown and described.

In some embodiments, different types of calibration targets may be used together. For example, multiple calibration targets having different shapes, different sizes, different types of fiducial markers thereon, and/or different arrangement of fiducial markers thereon may be used. In such embodiments, each of the different types of calibration target may be used to calibrate for a different aspect of the camera. For example, a first calibration target may have fiducial markers used to detect distortions (e.g., barrel distortions or pincushion distortions) and a second calibration target may have fiducial markers (e.g., fiducial markers of varying colors) used to detect chromatic distortions. In embodiments having multiple types of calibration targets, each calibration target may have one or more indicators used for identification. The one or more indicators used for identification may allow a processor (e.g., executing a calibration method stored in a data storage within a computing device) to uniquely identify each type of calibration target present in a calibration image that includes multiple types calibration targets. In various embodiments, the indicators may include one or more of the following: specific types of fiducial markers used for identification (e.g., barcodes, QUICK RESPONSE (QR)® Codes, etc.) on the respective calibration target, specific types of identification text (e.g., identification (ID) numbers or ID words) on the respective calibration target, specific types of fiducial markers used for calibration on the respective calibration target, specific arrangements of fiducial markers used for calibration on the respective calibration target, specific coloration of the respective calibration target, specific coloration of the fiducial markers on the respective calibration target, size of the respective calibration target, shape of the respective calibration target, or orientation of the respective calibration target relative to a camera.

III. Example Processes

Figure 8:
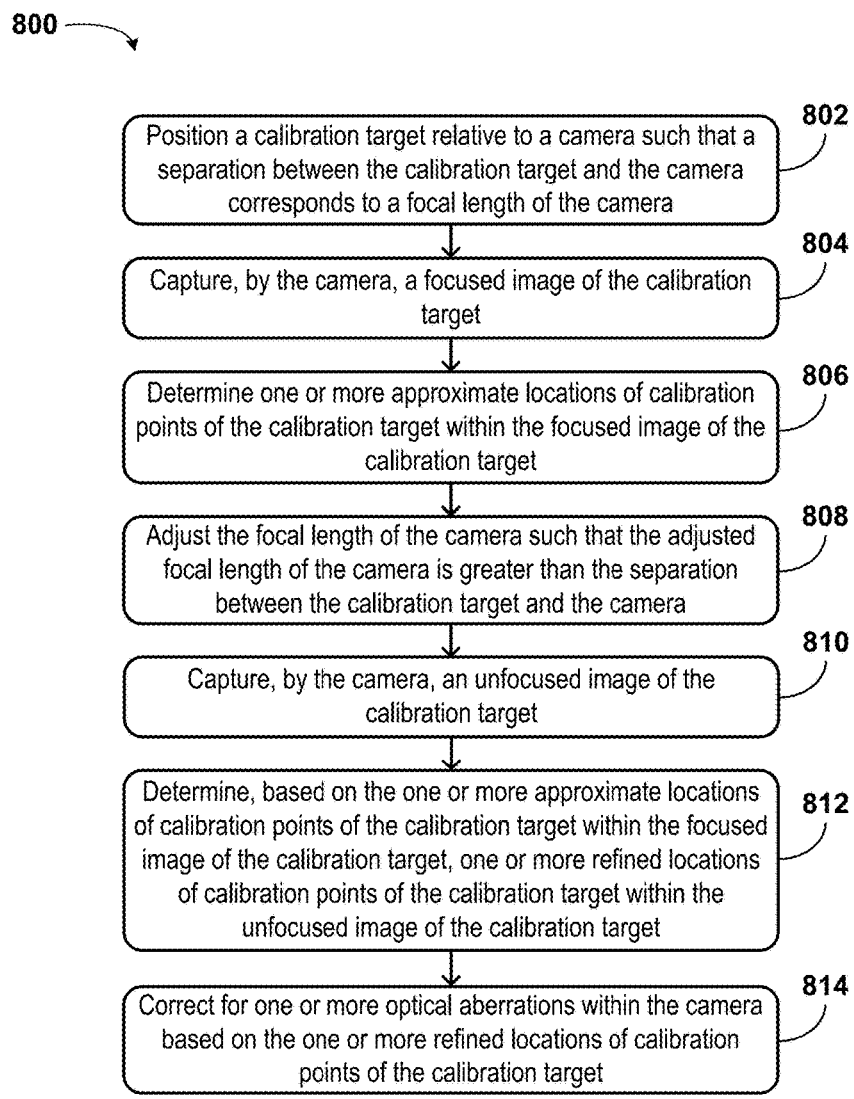
FIG. 8 is an illustration of a method, according to example embodiments.

FIG. 8 is a flowchart diagram of a method 800, according to example embodiments. The method 800 may be performed by the system 100 illustrated in FIG. 1A, for example.

In some embodiments, one or more of the blocks of FIG. 8 may be performed by a computing device (e.g., the computing device 106 illustrated in FIG. 1C). The computing device may include computing components such as a non-volatile memory (e.g., a hard drive or a ROM), a volatile memory (e.g., a random-access memory (RAM), such as dynamic random-access memory (DRAM) or static random-access memory (SRAM)), a user-input device (e.g., a mouse or a keyboard), a display (e.g., an LED display or a liquid-crystal display (LCD)), and/or a network communication controller (e.g., a WIFI® controller, based on IEEE 802.11 standards, or an Ethernet controller). The computing device, for example, may execute instructions stored on a non-transitory, computer-readable medium (e.g., a hard drive) to perform one or more of the operations contemplated herein.

At block 802, the method 800 may include positioning a calibration target relative to a camera such that a separation between the calibration target and the camera corresponds to a focal length of the camera.

At block 804, the method 800 may include capturing, by the camera, a focused image of the calibration target.

At block 806, the method 800 may include determining one or more approximate locations of calibration points of the calibration target within the focused image of the calibration target.

At block 808, the method 800 may include adjusting the focal length of the camera such that the adjusted focal length of the camera is greater than the separation between the calibration target and the camera.

At block 810, the method 800 may include capturing, by the camera, an unfocused image of the calibration target.

At block 812, the method 800 may include determining, based on the one or more approximate locations of calibration points of the calibration target within the focused image of the calibration target, one or more refined locations of calibration points of the calibration target within the unfocused image of the calibration target.

At block 814, the method 800 may include correcting for one or more optical aberrations within the camera based on the one or more refined locations of calibration points of the calibration target.

In some embodiments of block 814, correcting for the one or more optical aberrations within the camera may include adjusting or changing one or more optical elements of the camera. Changing one or more optical elements of the camera may correspond to modifying a lens of the camera (e.g., adjusting a focal length of the lens), swapping a lens of the camera (e.g., for an alternative lens have different optical characteristics), applying a lens to the camera (e.g., applying a collimating lens to the camera), removing a lens of the camera (e.g., removing a collimating lens from the camera), applying a chromatic filter to the camera, removing a chromatic filter from the camera, adjusting a chromatic filter of the camera (e.g., adjusting a passband of a bandpass chromatic filter), swapping a chromatic filter of the camera (e.g., interchanging a chromatic filter with a given range of transmitted wavelengths for a chromatic filter having a different range of transmitted wavelengths), applying a neutral-density filter to the camera, removing a neutral-density filter from the camera, adjusting a neutral-density filter of the camera (e.g., adjusting a fractional transmittance of the neutral-density filter of the camera), swapping a neutral-density filter of the camera (e.g., interchanging a neutral-density filter with a given fractional transmittance for a neutral-density filter having a different fractional transmittance), applying a polarization filter to the camera, removing a polarization filter from the camera, adjusting a polarization filter of the camera (e.g., adjusting which polarizations are transmitted by the polarization filter and/or which polarizations are blocked by the polarization filter), swapping a polarization filter of the camera (e.g., interchanging a polarization filter that transmits horizontally polarized light for a polarization filter that transmits vertically polarized light), etc.

In some embodiments, the method 800 may also include, after correcting for one or more optical aberrations within the camera, capturing a calibration image for calibrating a LIDAR system. The LIDAR system may include a transmitter and receiver. Further, the method 800 may include adjusting a position or orientation of at least one of the transmitter or receiver of the LIDAR system based on the calibration image for the LIDAR system.

In some embodiments of block 806, the one or more approximate locations of calibration points of the calibration target within the focused image of the calibration target may include a horizontal integer pixel location and a vertical integer pixel location within the focused image of the calibration target.

In some embodiments of block 812, the one or more refined locations of calibration points of the calibration target within the unfocused image of the calibration target may include a horizontal subpixel location and a vertical subpixel location within the unfocused image of the calibration target.

In some embodiments of block 814, the one or more optical aberrations within the camera may include a barrel distortion, a pincushion distortion, a mustache distortion, a coma, a tilt, an astigmatism, or a spherical aberration.

In some embodiments of block 804, the calibration target may occupy at least about 50% of the focused image of the calibration target by area. Similarly, in some embodiments of block 810, the calibration target may occupy at least about 50% of the unfocused image of the calibration target by area.

In some embodiments of block 814, correcting for the one or more optical aberrations within the camera may include estimating one or more parameters of a camera matrix corresponding to the camera based on a pinhole camera model.

In some embodiments of block 802, positioning the calibration target relative to the camera may include auto-focusing the camera in order to modify the focal length of the camera such that the focal length of the camera matches the separation between the calibration target and the camera.

In some embodiments of block 806, the approximate locations of calibration points of the calibration target within the focused image of the calibration target are determined using a corner-detection algorithm.

In some embodiments of block 806, the approximate locations of calibration points of the calibration target within the focused image of the calibration target are determined based on a human-in-the-loop selection of one or more locations within the focused image of the calibration target.

In some embodiments of block 814, correcting for the one or more optical aberrations within the camera may include performing image processing on one or more images captured by the camera to account for the one or more optical aberrations. Further, in some embodiments, performing image processing on the one or more images captured by the camera to account for the one or more optical aberrations may include estimating a deviation from a rectilinear projection within the unfocused image of the calibration target based on the one or more refined locations of calibration points. Additionally, performing image processing on the one or more images captured by the camera to account for the one or more optical aberrations may include modifying the one or more images captured by the camera to account for the deviation from the rectilinear projection.

In some embodiments of block 806, the one or more approximate locations of calibration points of the calibration target within the focused image of the calibration target are determined using at least one of a Moravec corner-detection algorithm, a Harris and Stephens corner-detection algorithm, a Plessey corner-detection algorithm, a Shi-Tomasi corner-detection algorithm, a Förstner corner-detection algorithm, a multi-scale Harris operator, a Wang and Brady corner-detection algorithm, a smallest univalue segment assimilating nucleus (SUSAN) corner-detection algorithm, a Trajkovic and Hedley corner-detection algorithm, or a corner-detection algorithm based on features determined by an accelerated segment test (AST).

In some embodiments, positioning the calibration target relative to the camera may include positioning the calibration target at a first position. Similarly, capturing the focused image of the calibration target may include capturing the focused image of the calibration target at the first position. Further similarly, capturing the unfocused image of the calibration target may include capturing the unfocused image of the calibration target at the first position. Further, the method 800 may also include positioning the calibration target at a second position such that a separation between the calibration target and the camera corresponds to the focal length of the camera. Additionally, the method 800 may include capturing, by the camera having the focal length, an additional focused image of the calibration target at the second position. Still further, the method 800 may include determining one or more additional approximate locations of calibration points of the calibration target within the additional focused image of the calibration target. In addition, the method 800 may include capturing, by the camera having the adjusted focal length, an additional unfocused image of the calibration target at the second position. Even further, the method 800 may include determining, based on the one or more additional approximate locations of calibration points of the calibration target within the additional focused image of the calibration target, one or more additional refined locations of calibration points of the calibration target within the additional unfocused image of the calibration target. Even still further, correcting for the one or more optical aberrations within the camera may also be based on the one or more additional refined locations of calibration points of the calibration target.

In some embodiments, positioning the calibration target at the first position may include placing the calibration target on a first stand. The first stand may be positioned at a first height relative to the camera and at a first angle relative to the camera. Further, positioning the calibration target at the second position may include placing the calibration target on a second stand. The second stand may be positioned at a second height relative to the camera and at a second angle relative to the camera. The first height relative to the camera may be different than the second height relative to the camera. Additionally, the first angle relative to the camera may be different than the second angle relative to the camera.

In some embodiments of block 810, the unfocused image of the calibration target may be at least partially blurred due to the adjusted focal length of the camera.

In some embodiments of block 812, the one or more refined locations of calibration points of the calibration target within the unfocused image of the calibration target may be determined using a corner-refinement algorithm.

In some embodiments, the method 800 may include determining correlations between the refined locations 304 of the calibration points within a calibration image (e.g., the unfocused image of the calibration target 204) and actual, physical locations of calibration points as printed on a calibration target 104. In some embodiments, the locations and identifications of the one or more fiducial markers on the calibration target 104 (i.e., "ground truth") may be established based on one or more methods used to print fiducial markers on the calibration target 104 (e.g., based on the spacing/intensity of a two-dimensional pattern used to print the calibration target 104). Based on these determined correlations, parameters of a camera matrix may be estimated using a pinhole camera model. Using the pinhole camera model may include determining a three-dimensional location of a pinhole representing an aperture of the camera 102 using the determined correlations. Additionally or alternatively, calibrating the camera 102 may include accounting for radial distortions or tangential distortions.

Using one or more calibration images, camera parameters (e.g., parameters of a camera matrix corresponding to the pinhole camera model) may be optimized. This optimization may correspond to a minimized reprojection error in mapping the three-dimensional location of each fiducial marker to the two-dimensional location of the fiducial markers in the calibration images.

Determining a three-dimensional location of a pinhole corresponding to the aperture of the camera 102 using the determined correlations may be an NP-hard problem. As such, in some embodiments, once the location of the pinhole has been determined, additional calibrations may be performed to determine whether a camera matrix associated with the calibrated camera 102 is still accurate to within a given degree (e.g., after a predefined amount of time has elapsed during which the camera may have become detuned). Determining whether the camera matrix is accurate to within a given degree may require fewer calculations, as such a comparison may not be an NP-hard problem (whereas the original determination of the camera matrix may be).

Further, calibrating the camera 102 using captured calibration images may include determining an angular orientation, relative to the image sensor in the camera 102, of each pixel in the camera 102. Determining an angular orientation for each pixel may include generating a lookup table of angles for each pixel. Alternatively, determining an angular orientation for each pixel may include generating a parametrization that describes the angles (e.g., a parameterization based on two, three, four, five, six, seven, eight, nine, ten, etc. variables). Generating a parametrization may be less computationally intensive than generating a lookup table.

In some embodiments, the method may also include rotating the camera 102 relative to the calibration target 104 and capturing additional calibration images. Rotating the camera 102 relative to the calibration target 104 may include rotating the camera 102 about a pitch axis (e.g., about an x-axis), about a roll axis (e.g., about a y-axis), about a yaw axis (e.g., about a z-axis), or about a superposition of axes selected from among the pitch axis, roll axis, and yaw axis. Rotating the camera 102 may allow for one or more additional calibration images to be captured from different perspectives relative to the calibration target 104. Additionally or alternatively, rotating the camera 102 may allow for additional calibration images to be captured such that the entirety of the calibration target 104 is captured among the set of calibration images. For example, if the field of view of the camera 102 is narrower (in one or more dimensions) than the calibration target 104 based on the position of the camera 102 relative to the calibration target 104, multiple calibration images may be captured of the calibration target 104 such that the entirety of the calibration target 104 is captured.

In some embodiments, the method 800 may also include translating the camera 102 relative to the calibration target 104 and capturing an additional calibration image. Translating the camera 102 relative to the calibration target 104 may include translating the camera 102 in a horizontal direction parallel to the calibration target 104 (e.g., x-direction), a vertical direction parallel to the calibration target 104 (e.g., z-direction), or a superposition of those directions. Translating the camera 102 may allow for one or more additional calibration images to be captured from different perspectives relative to the calibration target 104. A calibration of the camera 102 may then be performed using both the calibration image captured before translating the camera 102 and the one or more additional calibration images captured from different perspectives after translating the camera 102.

The method 800 may further include cropping a calibration image into two or more calibration sub-images (e.g., in embodiments having multiple calibration targets present in a single calibration image). In this way, calibration targets can be isolated in calibration sub-images and analyzed individually. Such an individual analysis of each calibration sub-image may take into account the fact that the calibration targets may be at different angles and/or depths with respect to the camera 102.

IV. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including RAM, a disk drive, a solid state drive, or another storage medium.

The computer-readable medium can also include non-transitory computer-readable media such as computer-readable media that store data for short periods of time like register memory and processor cache. The computer-readable media can further include non-transitory computer-readable media that store program code and/or data for longer periods of time. Thus, the computer-readable media may include secondary or persistent long term storage, like ROM, optical or magnetic disks, solid state drives, compact-disc read only memory (CD-ROM), for example. The computer-readable media can also be any other volatile or non-volatile storage systems. A computer-readable medium can be considered a computer-readable storage medium, for example, or a tangible storage device.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
    positioning a calibration target relative to a camera such that a separation between the calibration target and the camera corresponds to a focal length of the camera;
    capturing, by the camera, a focused image of the calibration target;
    determining one or more approximate locations of calibration points of the calibration target within the focused image of the calibration target;
    adjusting the focal length of the camera such that the adjusted focal length of the camera is greater than the separation between the calibration target and the camera;
    capturing, by the camera, an unfocused image of the calibration target;
    determining, based on the one or more approximate locations of calibration points of the calibration target within the focused image of the calibration target, one or more refined locations of calibration points of the calibration target within the unfocused image of the calibration target; and
    correcting for one or more optical aberrations within the camera based on the one or more refined locations of calibration points of the calibration target.

2. The method of claim 1, wherein correcting for the one or more optical aberrations within the camera comprises adjusting or changing one or more optical elements of the camera.

3. The method of claim 1, further comprising:
    after correcting for one or more optical aberrations within the camera, capturing a calibration image for calibrating a light detection and ranging (LIDAR) system, wherein the LIDAR system comprises a transmitter and a receiver; and
    adjusting a position or orientation of at least one of the transmitter or receiver of the LIDAR system based on the calibration image for the LIDAR system.

4. The method of claim 1, wherein each of the one or more approximate locations of calibration points of the calibration target within the focused image of the calibration target comprises a horizontal integer pixel location and a vertical integer pixel location within the focused image of the calibration target.

5. The method of claim 1, wherein each of the one or more refined locations of calibration points of the calibration target within the unfocused image of the calibration target comprises a horizontal subpixel location and a vertical subpixel location within the unfocused image of the calibration target.

6. The method of claim 1, wherein the one or more optical aberrations within the camera comprise at least one of a barrel distortion, a pincushion distortion, a mustache distortion, a coma, a tilt, an astigmatism, or a spherical aberration.

7. The method of claim 1,
    wherein the calibration target occupies at least about 50% of the focused image of the calibration target by area, and wherein the calibration target occupies at least about 50% of the unfocused image of the calibration target by area.

8. The method of claim 1, wherein correcting for the one or more optical aberrations within the camera comprises estimating one or more parameters of a camera matrix corresponding to the camera based on a pinhole camera model.

9. The method of claim 1, wherein positioning the calibration target relative to the camera comprises autofocusing the camera in order to modify the focal length of the camera such that the focal length of the camera matches the separation between the calibration target and the camera.

10. The method of claim 1, wherein the approximate locations of calibration points of the calibration target within the focused image of the calibration target are determined using a corner-detection algorithm.

11. The method of claim 1, wherein the approximate locations of calibration points of the calibration target within the focused image of the calibration target are determined based on a human-in-the-loop selection of one or more locations within the focused image of the calibration target.

12. The method of claim 1, wherein correcting for the one or more optical aberrations within the camera comprises performing image processing on one or more images captured by the camera to account for the one or more optical aberrations.

13. The method of claim 12, wherein performing image processing on the one or more images captured by the camera to account for the one or more optical aberrations comprises:
    estimating a deviation from a rectilinear projection within the unfocused image of the calibration target based on the one or more refined locations of calibration points; and
    modifying the one or more images captured by the camera to account for the deviation from the rectilinear projection.

14. The method of claim 1, wherein the one or more approximate locations of calibration points of the calibration target within the focused image of the calibration target are determined using at least one of a Moravec corner-detection algorithm, a Harris and Stephens corner-detection algorithm, a Plessey corner-detection algorithm, a Shi-Tomasi corner-detection algorithm, a Förstner corner-detection algorithm, a multi-scale Harris operator, a Wang and Brady corner-detection algorithm, a smallest univalue segment assimilating nucleus (SUSAN) corner-detection algorithm, a Trajkovic and Hedley corner-detection algorithm, or a corner-detection algorithm based on features determined by an accelerated segment test (AST).

15. The method of claim 1,
    wherein positioning the calibration target relative to the camera comprises positioning the calibration target at a first position,
    wherein capturing the focused image of the calibration target comprises capturing the focused image of the calibration target at the first position,
    wherein capturing the unfocused image of the calibration target comprises capturing the unfocused image of the calibration target at the first position,
    wherein the method further comprises:
        positioning the calibration target at a second position such that a separation between the calibration target and the camera corresponds to the focal length of the camera;
        capturing, by the camera having the focal length, an additional focused image of the calibration target at the second position;
        determining one or more additional approximate locations of calibration points of the calibration target within the additional focused image of the calibration target;
        capturing, by the camera having the adjusted focal length, an additional unfocused image of the calibration target at the second position; and
        determining, based on the one or more additional approximate locations of calibration points of the calibration target within the additional focused image of the calibration target, one or more additional refined locations of calibration points of the calibration target within the additional unfocused image of the calibration target, and
    wherein correcting for the one or more optical aberrations within the camera is also based on the one or more additional refined locations of calibration points of the calibration target.

16. The method of claim 15,
    wherein positioning the calibration target at the first position comprises placing the calibration target on a first stand,
    wherein the first stand is positioned at a first height relative to the camera and at a first angle relative to the camera,
    wherein positioning the calibration target at the second position comprises placing the calibration target on a second stand,
    wherein the second stand is positioned at a second height relative to the camera and at a second angle relative to the camera,
    wherein the first height relative to the camera is different than the second height relative to the camera, and
    wherein the first angle relative to the camera is different than the second angle relative to the camera.

17. The method of claim 1 wherein the unfocused image of the calibration target is at least partially blurred due to the adjusted focal length of the camera.

18. The method of claim 1, wherein the one or more refined locations of calibration points of the calibration target within the unfocused image of the calibration target are determined using a corner-refinement algorithm.

19. A non-transitory, computer-readable medium having instructions stored thereon, wherein the instructions, when executed by a processor, cause the processor to perform functions comprising:
    receiving a focused image of a calibration target positioned relative to a camera such that a separation between the calibration target and the camera corresponds to a focal length of the camera, wherein the focused image of the calibration target was captured by the camera;
    determining one or more approximate locations of calibration points of the calibration target within the focused image of the calibration target;
    receiving an unfocused image of the calibration target, wherein the unfocused image of the calibration target was captured by the camera with an adjusted focal length, and
    wherein the adjusted focal length of the camera is greater than the separation between the calibration target and the camera;
    determining, based on the one or more approximate locations of calibration points of the calibration target within the focused image of the calibration target, one or more refined locations of calibration points of the calibration target within the unfocused image of the calibration target; and correcting for one or more optical aberrations within the camera based on the one or more refined locations of calibration points of the calibration target.

20. A system comprising:

a calibration target;

a camera positioned relative to the calibration target such that a separation between the calibration target and the camera corresponds to a focal length of the camera, wherein the camera is configured to:

capture a focused image of the calibration target; and capture an unfocused image of the calibration target, wherein the unfocused image of the calibration target is captured by the camera with an adjusted focal length, and wherein the adjusted focal length of the camera is greater than the separation between the calibration target and the camera; and a computing device configured to:

receive the focused image of the calibration target and the unfocused image of the calibration target;

determine one or more approximate locations of calibration points of the calibration target within the focused image of the calibration target;

determine, based on the one or more approximate locations of calibration points of the calibration target within the focused image of the calibration target, one or more refined locations of calibration points of the calibration target within the unfocused image of the calibration target; and correct for one or more optical aberrations within the camera based on the one or more refined locations of calibration points of the calibration target.

\* \* \* \* \*